(12) United States Patent
Lawrence

(10) Patent No.: US 10,771,786 B2
(45) Date of Patent: Sep. 8, 2020

(54) METHOD AND SYSTEM OF VIDEO CODING USING AN IMAGE DATA CORRECTION MASK

(71) Applicant: INTEL CORPORATION, Santa Clara, CA (US)

(72) Inventor: Sean J Lawrence, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 1007 days.

(21) Appl. No.: 15/092,534

(22) Filed: Apr. 6, 2016

(65) Prior Publication Data

US 2017/0295372 A1    Oct. 12, 2017

(51) Int. Cl.
*H04N 19/132* (2014.01)
*H04N 19/593* (2014.01)
*H04N 19/136* (2014.01)
*H04N 19/182* (2014.01)

(52) U.S. Cl.
CPC ......... *H04N 19/132* (2014.11); *H04N 19/136* (2014.11); *H04N 19/182* (2014.11); *H04N 19/593* (2014.11)

(58) Field of Classification Search
CPC .. H04N 19/132; H04N 19/136; H04N 19/182; H04N 19/593
USPC .................................................. 375/240.02
See application file for complete search history.

(56) References Cited

U.S. PATENT DOCUMENTS

| | | |
|---|---|---|
| 2007/0263009 A1 | 11/2007 | Li et al. |
| 2014/0055450 A1 | 2/2014 | Limonov et al. |
| 2015/0131909 A1 | 5/2015 | Muninder et al. |
| 2016/0029027 A1 | 1/2016 | Katamaneni et al. |

FOREIGN PATENT DOCUMENTS

KP    1020140116777    10/2014

OTHER PUBLICATIONS

International Preliminary Report on Patentability for International Patent Application No. PCT/US17/20861, dated Oct. 18, 2018.
International Search Report & Written Opinion dated Jun. 5, 2017, for PCT Patent Application No. PCT/US17/20861.

*Primary Examiner* — Nguyen T Truong
(74) *Attorney, Agent, or Firm* — Green, Howard & Mughal LLP.

(57) ABSTRACT

A system, article, and method of video coding using an image data correction mask.

24 Claims, 13 Drawing Sheets

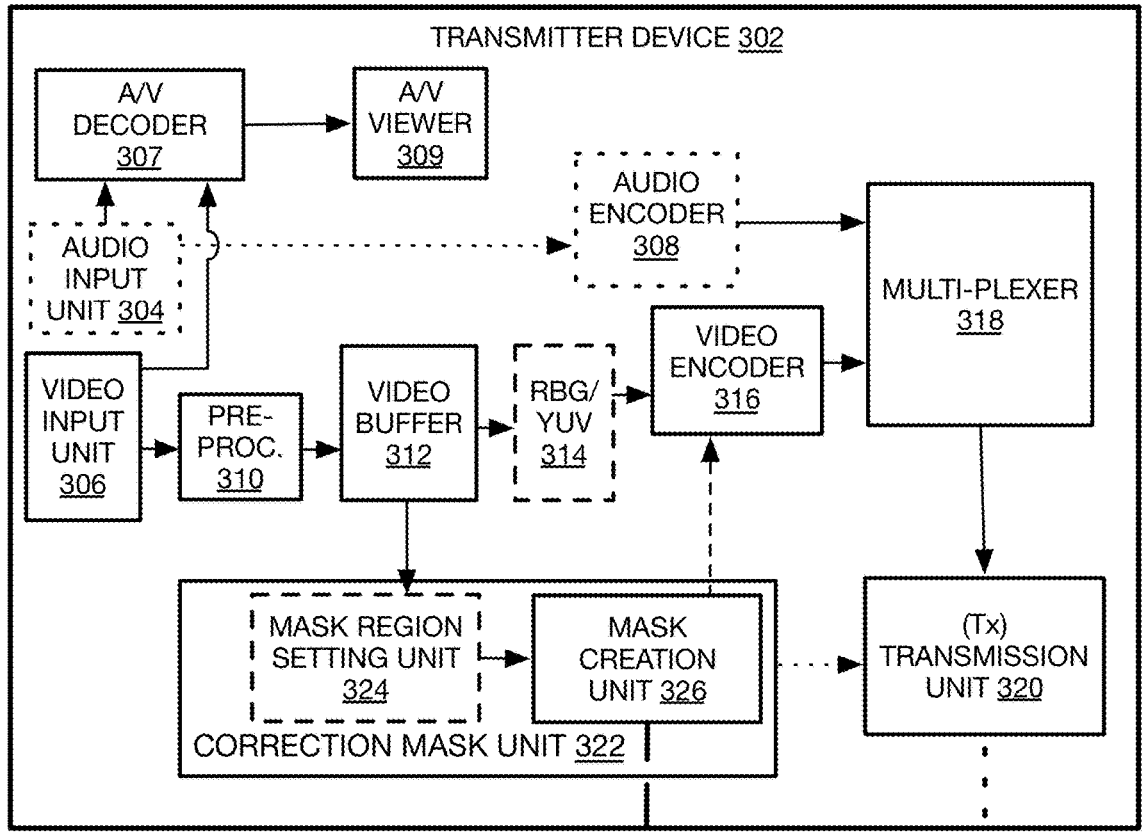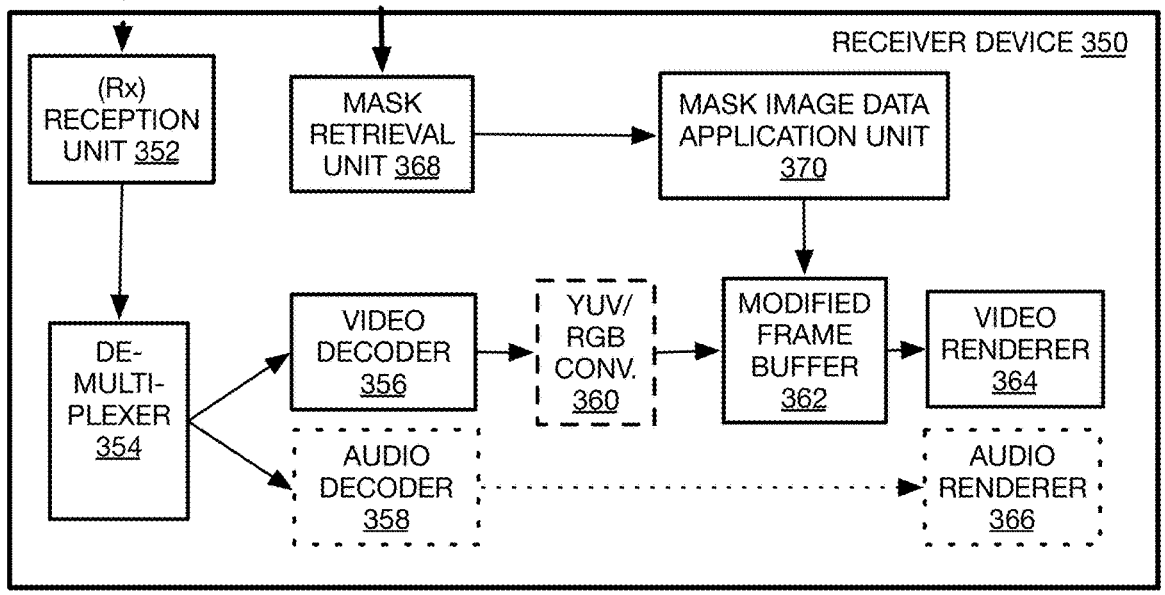
FIG. 3

FIG. 4A  400

RECEIVE COLOR PIXEL DATA OF AT LEAST ONE IMAGE 402

↓

DETERMINE, ON THE AT LEAST ONE IMAGE, AT LEAST A FIRST AREA OF ONE UNIFORM COLOR ADJACENT A SECOND AREA OF A UNIFORM COLOR 404

↓

FORM A MASK COMPRISING MASK IMAGE DATA AT LEAST COMPRISING A MAP INDICATING WHICH OF THE FIRST AND SECOND AREAS AT LEAST SOME PIXELS OF THE IMAGE BELONG 406

↓

PLACE THE MASK IN A BITSTREAM TO TRANSMIT THE MASK TO A RECEIVER TO HAVE THE COLOR OF AT LEAST SOME OF THE PIXELS OF THE FIRST AREA OR SECOND AREA OR BOTH ON A DECOMPRESSED VERSION OF THE IMAGE AT THE RECEIVER MODIFIED BY USING THE MAP TO DETERMINE THE CORRECT COLOR FOR THE PIXELS TO DISPLAY THE DECOMPRESSED IMAGE WITH THE PIXELS WITH CORRECTED COLORS 408

FIG. 4B  420

RECEIVE A MASK IN A BITSTREAM WITH MASK IMAGE DATA AT LEAST COMPRISING A MAP INDICATING WHETHER PIXELS OF AN IMAGE BELONG IN A FIRST AREA OF A UNIFORM COLOR IN THE IMAGE OR A SECOND AREA OF A UNIFORM COLOR IN THE IMAGE AND ADJACENT THE FIRST AREA IN ORDER TO CORRECT COLOR VALUES OF PIXELS IN THE FIRST AREA OR SECOND AREA OR BOTH ON A DECOMPRESSED VERSION OF THE IMAGE 410

↓

ALIGN THE MAP WITH THE FIRST AREA OR SECOND AREA OR BOTH 412

↓

CHANGE THE COLOR VALUES OF AT LEAST SOME OF THE PIXELS IN THE FIRST AREA OR THE SECOND AREA OR BOTH BY USING CORRECTION COLOR VALUES ASSOCIATED WITH THE FIRST OR SECOND AREAS 414

↓

DISPLAY THE FIRST AND SECOND AREAS ON THE IMAGE ON A DISPLAY INCLUDING THE PIXELS WITH THE CHANGED COLOR VALUES 416

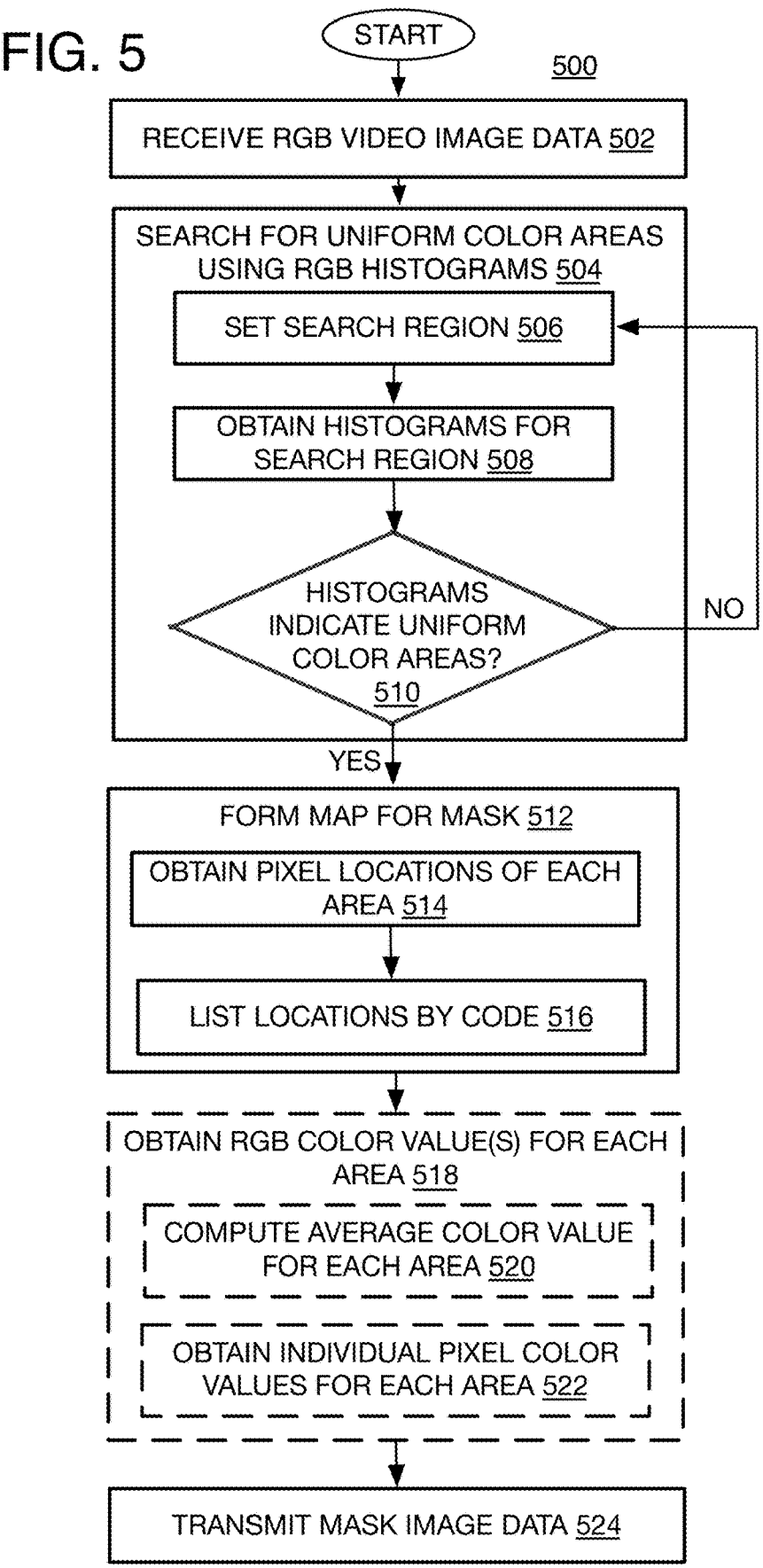

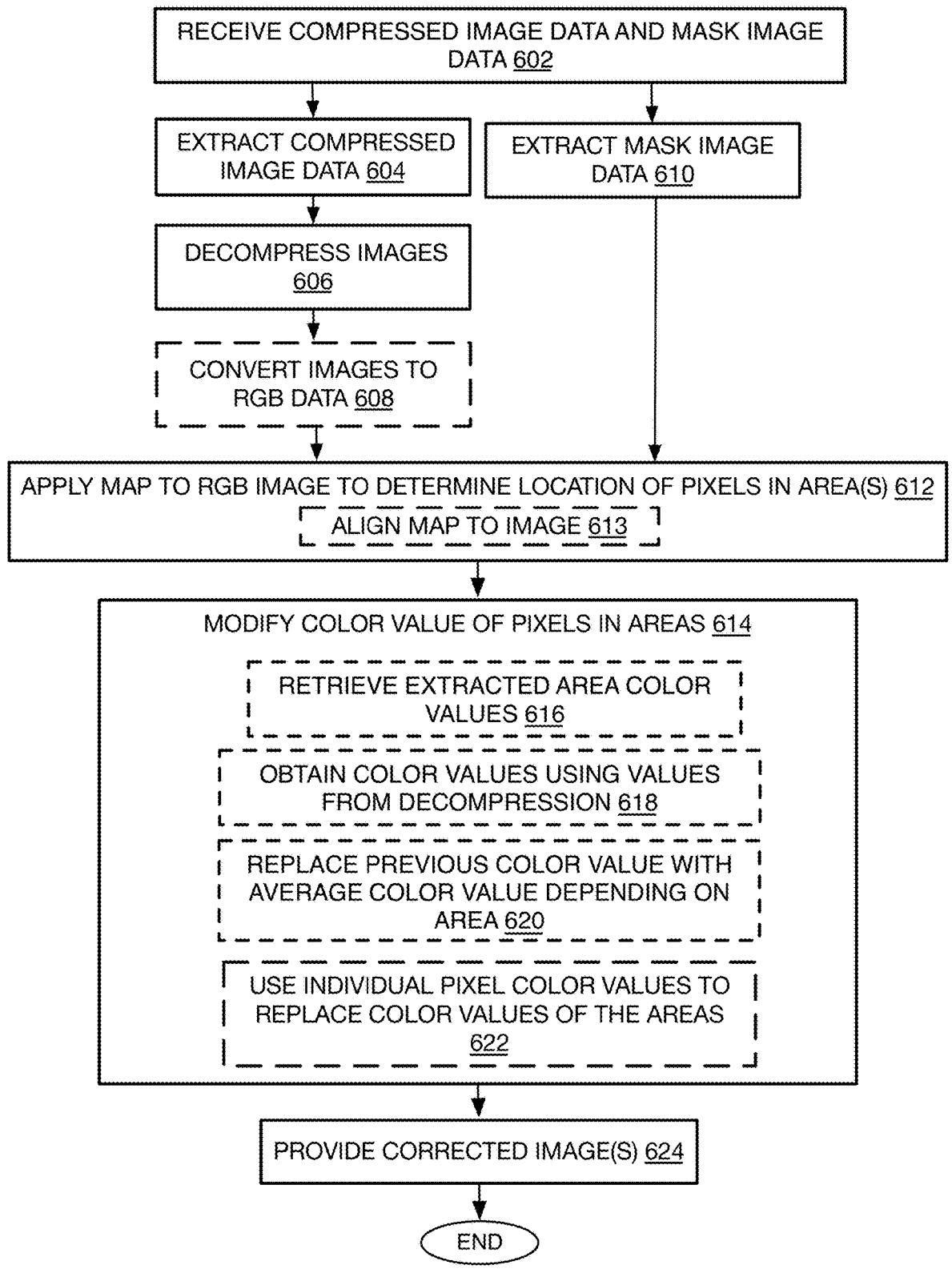

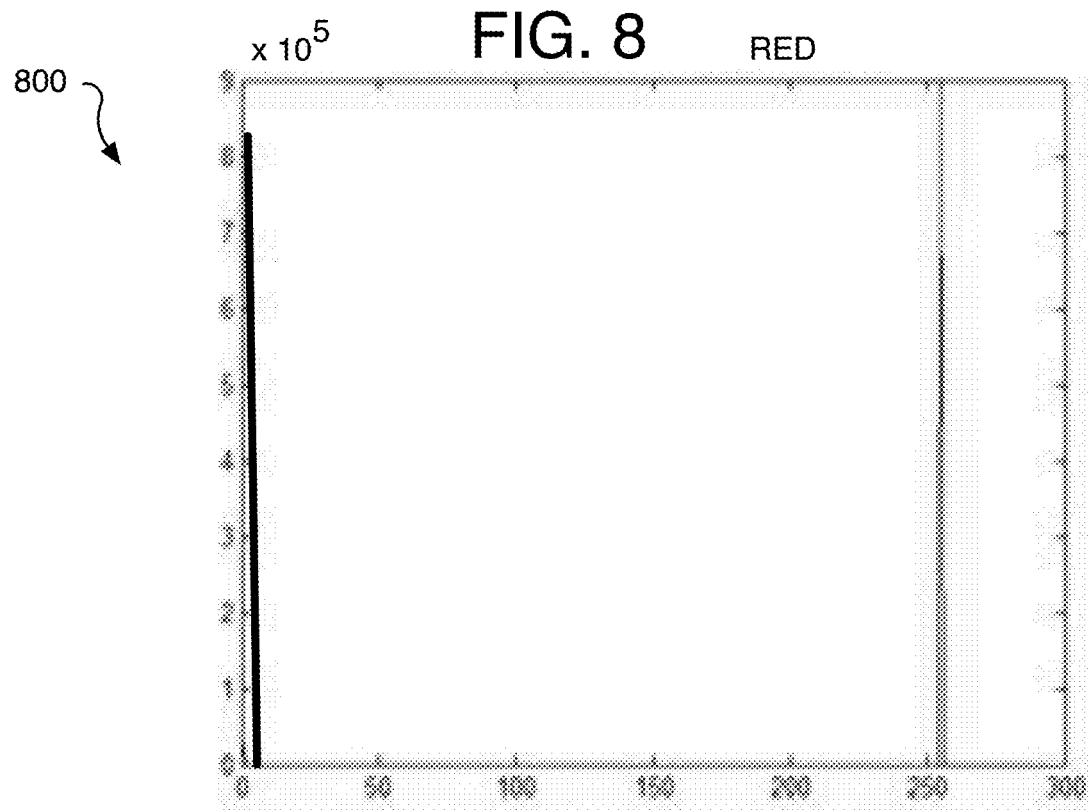
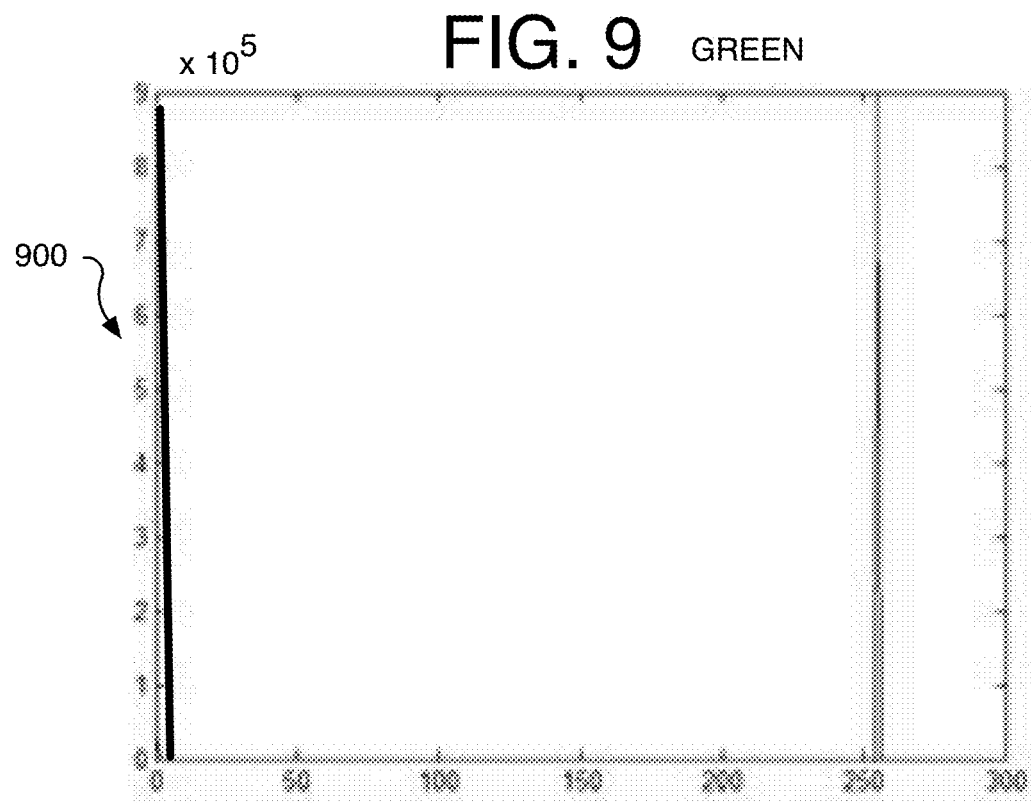

abcdefghijklmnopqrstuvwxy
abcdefghijklmnopqrstuvwxy
abcdefghijklmnopqrstuvwxy
abcdefghijklmnopqrstuvwxy
abcdefghijklmnopqrstuvwxy

METHOD AND SYSTEM OF VIDEO CODING USING AN IMAGE DATA CORRECTION MASK

BACKGROUND

Video coding systems compress image data on one device for transmission to another device. This may include videos downloaded over wired or wireless networks such as cable television, satellite, and WiFi. Other such video coding systems are short-range or personal area network (PAN) mirroring systems that transmit video and/or audio files, or otherwise what is viewed on the screen and audible on a transmitting device, and typically to a remote receiving device that is more convenient or provides a better experience for viewing or listening to the video and/or audio. For example, a movie may be played or processed on a smartphone while viewing the video of the movie and listening to the audio on a large television. In other examples, the screen of a laptop may be transmitted to a conference room projector, or a cable box may transmit a show to a smaller device such as a tablet in addition to, or instead of, the television.

Much priority has been placed on reducing latency on these video devices. Latency is the duration from the moment a video is played or processed on a source device to time that the video is played on a destination device. To this end, the compression techniques have been highly efficient by reducing the computational load and the number of bits that are sent to the destination device including the use of efficient subsampling techniques of color values and encoding techniques such as quantization. This priority, however, has often sacrificed the quality of the image at the destination device. This is true even on images with simple color patterns, such as when a screen merely shows a one color background and text in another color as with many different applications. In these cases, the edges of the text may have artifacts causing the text edges to appear to blur or blink and the text may have the wrong colors or a combination of colors when the text should be a single color. This becomes very important since images that only show text on a background is very common.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 3 is a schematic diagram of an example video processing system used to perform the methods of image processing with image data correction masks in accordance with the implementations herein;

FIG. 4A is a flow chart of a method of video coding using an image data correction mask in accordance with the implementations herein;

FIG. 4B is a flow chart of another method of video coding using an image data correction mask in accordance with the implementations herein;

FIG. 5 is a detailed flow chart of a method of video coding using an image data correction mask in accordance with the implementations herein;

FIG. 6 is a detailed flow chart of another method of video coding using an image data correction mask in accordance with the implementations herein;

FIG. 8 is an illustration of a color component histogram used in accordance with the implementations herein;

FIG. 9 is an illustration of another color component histogram used in accordance with the implementations herein;

DETAILED DESCRIPTION

Figure 1:
FIG. 1 is an illustration of an original sample text region of an image.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as laptop or desktop computers, tablets, mobile devices such as smart phones and other wearable smart devices such as smartglasses, smart watches, exercise bands, or smart headphones, video game panels or consoles, high definition audio systems, surround sound or neural surround home theatres, televisions, television set top boxes, projectors, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of video coding using an image data correction mask As mentioned, image processing and particularly video compression techniques that prioritize efficient compression often sacrifice image quality. This can occur with very common content such as text of one color on a single color background as with many different applications that compress the images at a source device and decompress these images for display at a destination device.

Figure 2:
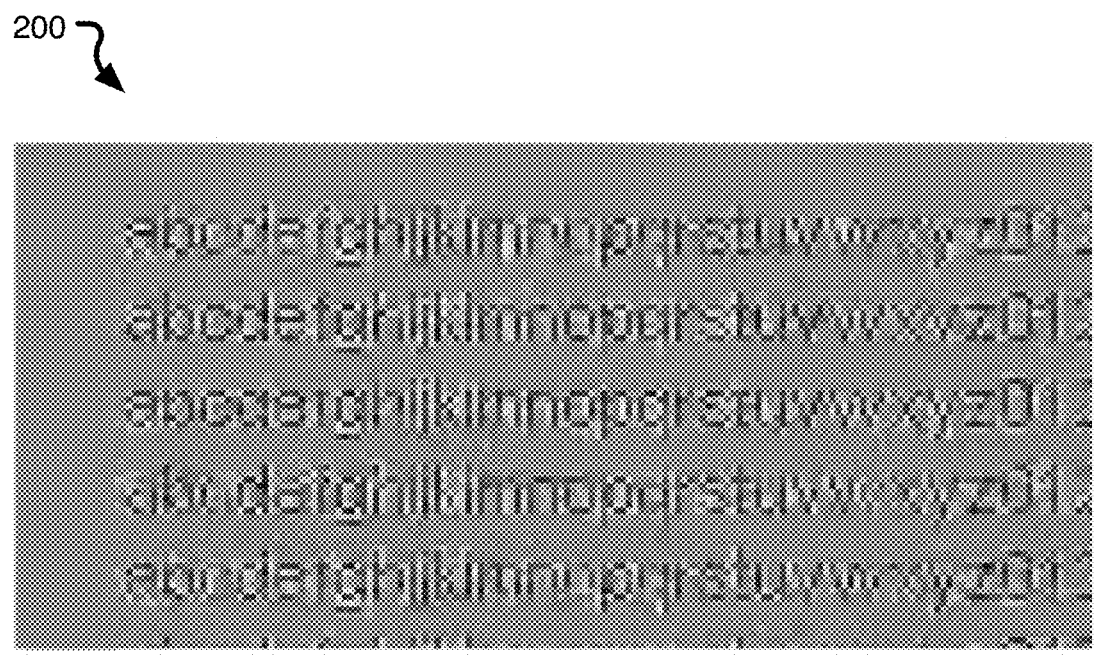
FIG. 2 is an illustration of the sample text region after compression and decompression showing artifacts.

Referring to FIG. 1, an image or region of an image 100 is shown with original sampled text 102 in red for example where the text has clear edges and it is easy to distinguish the text from the background 104 in green by one example. Referring to FIG. 2, an image or image region 200 is formed after compression, transmission, and decompression and has artifacts such that anywhere on the text 202, but particularly pixels near or forming the border or edges of the text with the background 204, display incorrect colors and mosquito noise. Mosquito noise is characterized by unwanted changes in color on pixels frame-to-frame in a video sequence resulting in a shimmering blur of dots around or near the edges. Such artifacts can make it difficult or even impossible to read the text.

These artifacts are often the result of chroma information sub-sampling for encoder solutions such as YUV 4:2:0 and 4:2:2 used for many different video coding systems. Specifically, images are typically captured or otherwise obtained in the RGB color space by a Bayer filter, for example, and are then converted to YUV color space for encoding and other tasks. Generally in YUV sampling notation a 4×2 block of pixels is used, and 'Y' refers to a number of luminance samples in a single row, 'U' the number of chroma samples in the first or upper row, and 'V' the number of chroma samples in the next or second row. Thus, for example, for 4:2:0 forming a 4×2 sampling area, for a first row of 4 luminance values sampled, there are only two chroma values sampled in the first row and none in the second row. For 4:2:2 then, there is two chroma sampling in both the first and second rows. Relevant here, these sub-sampling schemes leave some non-sampled pixels without a chroma value. The color at these non-sampled pixels are formed either by intra-prediction by using the color of neighbor pixels on the same frame to form the color for a pixel missing a chroma sample, or inter-prediction which is using data from multiple frames. The formed or predicted color can be wrong and cause the artifacts mentioned above.

One attempt to resolve these issues was to use higher chroma sampling formats such as YUV 4:4:4 so that the chroma sampling takes place on every pixel. This arrangement, however, becomes bit expensive by increasing the number of bits processed and compressed, transmitted in a bitstream, and decompressed, which in turn increases the bandwidth requirements for video transmission applications on video transmission devices such as WiDi/Miracast, wireless docking, and other wireless systems to name a few examples either causing a slowing of the system or requiring physical upgrades to transmission equipment that provide a greater bandwidth but that becomes too financially expensive for the user desiring small inexpensive devices.

In order to counter the increased bandwidth requirements, the frame rate may be reduced. However, when images with quickly changing content is presented, the low frame rate may not be sufficient, and a sub-optimal viewing experience may result during conversion from the lower frame rate back to the higher frame rate due to the presence of playback artifacts.

The color artifacts also may be the result of quantization during the encoding process. The image data including color value residuals may be converted into coefficients using a discrete cosine transform (DCT) technique which are then quantized before entropy coding and placement into a compressed bitstream. The quantization is lossy compression that may lose the precision needed for color values to avoid artifacts when later decompressed.

To resolve these issues, it is determined whether an image, or just regions on the image, have areas with very few colors such as one area of one uniform color, and a second area of another uniform color. Due to the high frequency occurrences of the use of text in such situations (bi-color images or regions), and/or when it is otherwise highly likely that text is to be used, such as with text-related applications including word processors, presentation projections, and so forth, it is assumed that the image shows text of a single color on a single color background. Once such two uniform color areas are found, a mask with mask image data is formed for the region or image on the transmitter or source side, and transmitted to correct color values of decompressed images at the receiver. The mask image data may include a map of the first area or second area or both that shows which area includes which pixels. By one form, the map is a binary map of 0s for one area and 1s for the other area to differentiate between the two areas.

The mask image data also may include coordinates of the region to indicate where the map starts, ends, and so forth, and/or coordinates of the pixels in the two areas. The mask image data also may include at least one color value for each area. This may include color values that the pixels in the two areas should be and that are used to replace or modify initial color values determined by decompressing the images. Thus, the color values may be an average color value for each area, or color values for each or a sampling of individual pixels in the two areas. These color values may be in the RGB color space rather than the color space used for encoding such as YUV values.

The mask, generally considered to be in the form of the mask image data, then may be transmitted from a transmitter or source device to a receiver or destination (or sink) device. The map in the mask image data is then aligned with the corresponding text and background area of the image or region in the image thereby identifying which pixels belong in which area. The new color values, whether provided by the mask from the source or computed at the receiver, may be applied to all or individual pixels in the two areas. In one example, the new colors may be provided for all pixels of a first area (such as the text), and those pixels in the second area that are near, or at the edge of, the first area. The pixel color values may be applied to decompressed images already converted back to the RGB color space to be provided to a display for rendering the images.

The result is an image of higher quality where the text or first area is clearly distinguished from the second area or background with clean edges with no or little artifacts such as blurring and discoloration. This is accomplished while maintaining the bandwidth requirements, frame rate, resolution and other parameters as for the original encoded streams without the color correction mask. The application of the mask also need not be limited by the nature of the content and can be applied for quickly changing content as well. The details follow.

Referring to FIG. 3, an image processing system (or video coding device) 300 is one example system that can perform the mask-based color correction processes described herein. By this example, system 300 may have a data pipeline of a short-range screen mirroring system or personal area network (PAN) system that transmits images (and can optionally transmit audio) from a transmitting device 302 to a remote receiving device 350 for viewing alone or viewing and listening. The transmitting device may be processing or playing the video and/or audio during the transmission to the receiver. For example, a movie may be played on a smartphone while both viewing the video of the movie and listening to the audio on a large television. In other examples, the screen of a laptop may be transmitted to a conference room projector, or a cable box may transmit a show to a smaller device such as a tablet in addition to, or instead of, the television. Other examples include short range wireless displays with wireless docking. These systems are often described as wirelessly replacing the connection wire from the computer to the display and/or speaker. While the example of system 300 may be an audio-video (AV) processing system that performs both video and audio coding, it will be understood that the processes described herein may work equally well on systems that only perform video coding.

Particularly, the transmitter device (or just transmitter or source) 302 may be communicatively coupled or paired to the remote receiver device (or sink or simply receiver) 350 to transmit a bitstream with either a video data signal alone or an audio-video (AV) data signal to the receiver device 350. The methods herein are particularly suited for wireless transmission of the video bitstream but some implementations may be wired.

By one implementation, the transmitter 302 has an audio input unit 304 and a video input unit 306. The audio and video for the input units may be obtained from a wide variety of upstream sources. This includes from volatile or non-volatile memory on the transmitter or accessible by the transmitter, audio and video streamed to the transmitter over wide area networks (WANs) such as the internet and/or other telecommunications networks, or provided over local area networks (LANs) such as that within an office, residence, or other facility. The transmitter and receiver also may be, may be part of, or may have one or more cameras and audio capture devices such as one or more microphones. Many arrangements are possible including the receipt of video without audio.

When the transmitter 302 optionally has the capability to display and/or play audio and video input such as with a smartphone, the transmitter 302 may have an AV decoder 307 that provides decoded AV data to an AV viewer 309. Thus, in some cases it may be possible to view the video on the transmitter while also viewing the video on the receiver. In some cases, the viewer 309 may be turned off while paired to the receiver. The AV decoder 307 may implement a codec compatible with that implemented by an AV source upstream of the transmitter when so provided and to generate audio and video data.

Once obtained from the audio and video input units 304 and 306, the audio and video data streams may be respectively provided to an audio encoder 308 and a video encoder 316. The processing details for encoding the audio are not relevant here.

On the video side, the raw data, obtained by using a Bayer filter for example, may be provided to a pre-processing unit 310 that applies pre-processing to the image data in the RGB color space such as demosaicing to obtain RGB values for each or individual pixels, trimming, other color correction techniques, and/or de-noising. The RGB color space images are then stored in a video buffer 312 that may be RAM, such as DRAM, cache, or other memory. The image data may be obtained for correction mask operations as explained below from this buffer. Otherwise, the image data from the video buffer 312 is then converted from RGB to YUV color space by a convertor 314 before being provided to the video encoder 316. It will be appreciated that other pre-processing operations such as additional de-noising and so forth maybe applied to the YUV formatted image data before being applied to, or by, the encoder 316. It will be appreciated that the convertor 314 maybe omitted or skipped when coding occurs in the same color space as that of the initially provided images.

The encoders 308 and 316 may implement any codec known to perform one or more of transformation, quantization, motion compensated prediction, loop filtering, and so forth. In some implementations, audio encoder 308 complies with one or more pulse code modulation (PCM) or linear pulse code modulation (LPCM) specifications such as 20 Digital Dolby AC-3, Dolby TrueHD, or Advanced Audio Coding (AAC), and so forth. In some implementations, video encoder 316 complies with one or more specifications maintained by the Motion Picture Experts Group (MPEG), such as, but not limited to, MPEG-1 (1993), MPEG-2(1995), MPEG-4 (1998), and associated International Organization for Standardization/International Electrotechnical Commission (IS O/IEC) specifications. In some exemplary implementations, encoders 308 and 316 comply with one or more of H.264/MPEG-4 AVC standard, HEVC standard, VP8 standard, VP9 standard specifications, and so forth.

System 300 also may include a multiplexer 318 to multiplex the coded elementary streams into a higher-level packetized stream that further includes metadata fields that transmit additional data such as mask image data as explained below. In some implementations, multiplexer 318 codes the packetized elementary streams (PESs) into an MPEG program stream (MPS), or more advantageously, into an MPEG or multiplexed transport stream (MTS). In further implementations, the MTS is encapsulated following one or more of Real-Time Protocol (RTP), user datagram Protocol (UDP) and Internet Protocol (IP) as implementations are not limited in this context. In some RTP implementations for example, a Network Abstraction Layer (NAL) encoder (not depicted) receives the MTS and generates Network Abstraction Layer Units (NAL units) that are suitable for wireless transmission.

The transmitter 302 also may include a (Tx) transmission unit (or transceiver) 320 that may form a WIFI or other network transmitter stack and may be a wireless transmission device that obtains the coded stream data from the multiplexer 318, and then outputs a wireless signal representative of the coded stream data the receiver 350, and in one form, directly to the receiver 350. By one approach, the transmission unit 320 may utilize any band known to be suitable for the purpose of directly conveying (e.g., peer-to-peer) the stream data for real time presentation on a sink device in a PAN system. The transmission unit 320 may operate in the 2.4 GHz and/or 5 GHz band (e.g., Wi-Fi 802.11n), and in some forms in the 60 GHz band. The transmission unit 320 may further support and/or comply with one or more High Definition Media Interface (HDMI) protocols, such as Wireless Home Digital Interface (WHDI), Wireless Display (WiDi), Wi-Fi Direct, Miracast, WiDock, WirelessHD, or Wireless Gigabit Alliance (WiGig) certification programs. By other approaches, the systems and methods herein, and in turn the transmission unit 320 is compatible with any wide area network (WAN) or local area network (LAN) used for such purposes.

The transmitter 302 also may include a correction mask unit 322 to correct the color of pixels in an image, or one or more regions of an image, that have a few areas with uniform colors. To accomplish this, the correction mask unit 322 may have a mask region setting unit 324 that searches for regions in an image that have the prerequisite few uniform color areas. A map is then formed indicating which uniform color area the pixels belong for regions that have the uniform color areas. The location of these regions are then provided to the mask creation unit 326 by providing coordinates of the region. Otherwise, the region setting unit 324 may be omitted or may simply be a searching unit when a search is performed merely to determine whether a substantially entire image has the two uniform color areas. The details for the searching are provided below.

The mask creation unit 326 may either determine an average color value for each area involved, or may obtain individual color values of the pixels in each area to be used to correct decompressed color values on the receiver side. The mask creation unit 326 then may provide the mask image data for transmission to the receiver 350. The mask image data may include the map, pixel or region coordinates when provided, and optionally the correction color values of the uniform color areas.

As shown by the different dashed lines, at least three different ways to transmit the mask image data to the receiver exists. First, the mask image data may be provided to the encoder 316 so that the mask image data is entropy encoded and placed in the bitstream with the other compressed image data include the YUV color and luminance values, residuals, motion vectors, and so forth. By a second option, the mask image data may be provided to the multiplexer 320 so that the mask image data in non-encoded form may be packetized and placed in the bitstream along with the packetized encoded data. Third, the mask image data may be transmitted to the receiver 350 in a bitstream separate from the band width of the bitstream providing the other compressed data from the multiplexer. The separate bitstream may or may not be handled by the transmission unit 320 and could be handled by a separate transmitter. To transmit a binary mask, the size of the mask may be equal to the size of the region identified by the search algorithm. Thus, if the region identified is 100×500 pixels by one possible example, the mask would be 50,000 bits before any compression is applied.

Turning now to the receiver 350, the receiver may be any compatible device that at least processes images, whether from a video sequence or still photos, for display on a display device and may process and emit audio as well. The receiver 350 may be communicatively coupled or paired to the transmitter 302 to receive a wireless transmission of at least video data and together with or separately from the mask, but can include audio data as well. To accomplish these features, the receiver 350 may have a Rx reception unit 352 that receives and forms a WiFi or other network receiver stack of frames of video (and optionally audio) from the transmitted bitstream as well as receiving the mask image data when the mask image data is provided in the same bitstream as the other compressed image data for example. Otherwise, either the reception unit 352 may receive a separate bitstream with the mask image data, or the receiver 300 could have a separate mask retrieval unit 368 to receive the mask transmitted on a separate bitstream. The reception unit 352 and the mask retrieval unit 368 when present may use any frequency band and wireless communication protocol compatible with that of the transmission unit 320. The output of the reception unit 352 is provided to a de-multiplexer (or demux) 354, which is to process the encapsulated packetized streams into separate audio and video compressed data inputs, and mask image data inputs when such are provided. Demux 354 includes logic then to unencapsulate and extract audio and video payloads from a packetized AV stream as well as the mask image data. The demux also may extract the map, any pixel or region coordinates provided, and any color values provided in the mask image data. In one form, demux 354 includes logic to de-multiplex the packet payloads based, at least in part, on MTS fields.

Decoders 356 and 358 may use any codec compatible with that of encoders 308 and 316 to generate decoded digital audio data and digital video data that represents the input data. Thus, the decoded data provided by the audio decoder 358 and video decoder 356 represents the input audio and video, in turn the audio and video signals transmitted in the bitstream to the receiver 350. The decoders may include any necessary pre-processing of the extracted image data, and the reconstruction of the images such that each pixel has a color value. As mentioned, this may include at least video coding but also may include parallel audio coding in an AV system. The video coding may be performed in a certain color space such as YUV but may not always be in this color space (it may be in RGB or others). The decoding also may include post-processing at least before conversion of the decompressed pixel data to RGB color space when it is needed.

Thus, the receiver also may have a YUV/RGB convertor 360 to convert decompressed color data (and actually the luminance values as well) into RGB color space data. When the decompression occurred in the RGB color space, the convertor is not used. The RGB convertor 360 provides RGB compatible images for rendering. It also has been found, however, that changing color data in the RGB color space after decompression can significantly raise the quality of the images by increasing the RGB pixel color value accuracy. Thus, by one example, the convertor 360 transforms the YUV luminance chroma chroma subsampling color space into RGB pixel values for each, or some other sampling, of pixels by known techniques. The RGB images are then held in a decompressed memory or buffer accessible to the mask image data application unit 370.

The mask image data application unit 370 retrieves the RGB images to apply the mask to the images. The images may be retrieved and modified one at a time, and the possible variations are described below. The mask image data application unit 370 determines the start pixel of the map and applies or "overlays" the map on the image or a region on the image, thereby assigning the pixels in the image or the region to one of the uniform color areas of the image or region. Thus, the map may be a listing of 1s and 0s in order from the start pixel in a pre-determined arrangement or pattern (such as a rectangular region of a certain number of rows and columns). Once the pixels have been assign to the uniform color areas, such as a first area that is text and a second area that is background, color values may be applied to those assigned pixels. As mentioned, the color values may have been extracted as part of the mask image data or may be computed or selected on the receiver side instead. By one approach, the color values are an average value for each uniform color area (and each color component), but otherwise may be individual correction sample pixel color values as described below. These color values then may be used to replace the RGB color values of the pixels obtained from the decompression. For example, all pixels or pixels in certain sections, such as near edges, of one of the uniform color areas may now have the average color value(s) as its color value(s). Alternatively, the individual correction sample pixel color values may be assigned to those pixels nearest to it relative to other selected individual pixels and in the uniform color areas. Otherwise, the individual sample correction color values may be combined in other ways such as by interpolation algorithms as explained below. Many variations are possible some of which are discussed below.

The color corrected or modified RGB images then may be placed in a modified frame buffer 362, where the images can then be retrieved for further post-processing, rendering and so forth. It will be understood that the buffer 362 may be provided on one memory or a number of different memories. It also will be understood that the buffer may actually form different portions of the same single buffer or memory shared with non-corrected images from the decoder and/or encoded extracted images, and so forth. Many variations are possible as long as images (or frames or packets of image data) can be moved in and out of each buffer.

Audio renderer 366 and video renderer 364 receives the video (and audio) data and forms a video rendering pipeline that terminates at one or more displays. An audio pipeline could optionally be provided as well and may terminate at one or more audio speakers. The audio renderer 366 and video renderer 364 may include any equipment that modifies or enhances the audio and video data before the audio and video is played. This may include amplifiers, equalizers, and so forth for audio, and scaling, 3D processing, and so forth for video.

Referring to FIG. 4A, an example process 400 of video coding using an image data correction mask is provided, and process 400 relates to the operations on a transmitter side of a video coding system. In the illustrated implementation, process 400 may include one or more operations, functions or actions as illustrated by one or more of operations 402 to 408 numbered evenly. By way of non-limiting example, process 400 may be described herein with reference to example video coding systems or devices of any of FIGS. 3 and 15-17, and where relevant.

Process 400 may include "receive color pixel data of at least one image" 402, and by one example, received by an encoder or transmitter of a video coding device or system. The images may be received in the form of frames of a video sequence captured by using a Bayer filter for example. Each frame or image (or picture) may have RGB values for each or individual pixels by a de-mosaicing-type process during pre-processing, by one example. The RGB image data then may be placed in a buffer accessible to the mask correction unit. While the present operations may be performed in the RGB space, the RGB image data may be further processed such as by conversion to another color space such as YUV before encoding. It also will be appreciated that the operations could be applied to a single isolated image whether from a video sequence or a still photo from a single shot camera.

Process 400 may include "determine, on the at least one image, at least a first area of one uniform color adjacent a second area of a uniform color" 404, and as described uniform may refer to a single color value on a color space range of available color values for one of the RGB values, or may refer to a very small variance or range of color values on a color space range. Thus, for example, assuming each of the three RGB color component values has a range of 0 to 255, then a uniform color of an area may be declared when a large number of pixels in an area being analyzed have the same three (RGB) color values, or the three color values have color values within 3, 5, or 10 color values of each other and of the 256 value range, to name a few possible examples. By one approach, RGB color component histograms are used to determine whether there are two areas of uniform color in the region or image. When the image, or a region on the image, has at least one color component histogram with two uniform color peaks as uniform is described above, and the other two color component histograms have one or two uniform color peaks, then the RGB histograms most likely indicate an image or region with two uniform colors, and are very likely to be text on a background in that case. The uniform color peak on the histogram may include a peak at the color value 0 (zero). The assumption that such two color areas are text is made since this occurrence is extremely common when colored text is presented on a color background. The image may be searched to determine whether the whole image is divided into two such areas, or the image may be searched by regions, whether dividing the image into fixed-location regions or a sliding window. Many variations are possible.

Process 400 may include "form a mask comprising mask image data at least comprising a map indicating which of the first and second areas at least some of the pixels of the image belong" 406. Thus, once it is determined that two uniform color areas exist and the location of those two areas, mask image data may be collected or pointed to for placement in a bitstream. The mask may include a binary map (see description of FIG. 11 for example) of the two areas with 0s designated as those pixels on one area and 1s designating those pixels on the other area. When the two areas are found in a certain region of the image or otherwise fill less than substantially the entire image, the coordinates of the two areas, or coordinates of the pixels of the two areas, are transmitted as part of the mask image data. In this case, the mask image data may include the coordinates of a region on the image or the coordinates of each or a sampled number of pixels in the region. When the two areas substantially fill the entire image, the coordinates need not be transmitted as explained below.

Otherwise, the mask image data may include at least one color value for each area. Specifically, by one option, the RGB values in each area may be averaged, and just the average RGB values are placed in the mask image data and transmitted. By another option, the RGB values for each or some sampling of the pixels in each area are transmitted as part of the mask image data. By yet other options, the RGB color value is omitted altogether and the average RGB color value (or other combination value) is computed on the receiver side. Many options are possible.

Process 400 may include "place the mask in a bitstream to transmit the mask to a receiver to have the color of at least some of the pixels of the first area or second area or both on a decompressed version of the image at the receiver modified by using the map to determine the correct color for the pixels to display the decompressed image with the pixels with corrected colors" 408. As mentioned, the mask image data then may be transmitted in a number of different ways. The mask may be provided to the encoder to at least entropy encode the image data before transmission, provided to the multiplexer without encoding the mask to be transmitted with the other compressed image data in the same band width, or transmitted in a separate bitstream band width. The details are provided below. The receiver decompresses encoded image data received in a bitstream and then may modify the resulting pixel values of the decompression depending on the received mask image data. The image can then be displayed with the improved pixel data. The details are as follows.

Referring to FIG. 4B, an example process 420 of video coding using an image data correction mask is provided, and process 420 relates to the operations on a receiver side of a video coding system. In the illustrated implementation, process 420 may include one or more operations, functions or actions as illustrated by one or more of operations 410 to 416 numbered evenly. By way of non-limiting example, process 400 may be described herein with reference to example video coding systems or devices of any of FIGS. 3 and 15-17, and where relevant.

Process 400 may include "receive a mask in a bitstream with mask image data at least comprising a map indicating whether pixels of an image belong in a first area of a uniform color in the image or a second area of a uniform color in the image and adjacent the first area in order to correct color values of pixels in the first area or second area or both on a decompressed version of the image" 410. Thus, the mask in the form of its mask image data may be received in a number of different formats as mentioned above, and by a video coding receiver device that has or is a decoder and has, is, or is connected to a display for displaying images of the video sequence associated with the mask. The mask image data may include at least the map which was described above, but the mask image data also can include coordinates of a region or pixels that form the two uniform color areas to indicate the placement or at least the start of the map. The mask image data may or may not include at least one color value for each area as explained below.

Process 400 may include "align the map with the first area or second area or both" 412, and this may include determining which pixels of a decompressed image are in the first area and second area. By one form, when the decompression takes place in a non-RGB color space, it is first converted to RGB color values before applying the mask. Then, this operation may include finding the start point of a region or pixel where the map begins, and then matching the binary values of the map to the pixels. When regions are used, the map has a known shape (number of rows and columns for instance) so that the binary values of the map can be matched to pixel locations (pixel-by-pixel). Thus, it will be clear which pixels (pixel-by-pixel) belongs to which area.

Process 400 may include "change the color values of at least some of the pixels in the first area or the second area or both by using correction color values associated with the first or second areas" 414. Once it is determined which of the first and second area pixels belong, either the correction color values are extracted from the transmitted mask image data, or the correction color values may be computed or selected on the receiver to change the decompressed color values of the pixels. As mentioned by one form, this may involve using an average color value of pixels in each area (and for each color component), again either computed previously from the original (or pre-encoding) source side values or by computing an RGB average using the decompressed color values. An alternative is to transmit and extract individual correction sample pixel RGB values (or use decompressed sample RGB pixel values) for each area. While all pixels of an area could be used, this will most likely be too much data and a sampling is used instead. Then those pixels on the decompressed image are changed to the correction color value of the closest sampling pixel or some combination of the sampled pixels such as an average or some other interpolation of a number of them. Many variations are possible. The computed or transmitted correction color values may replace the decompressed values but could be some combination of the correction color value and decompressed color value of a pixel.

Process 400 may include "display the first and second areas on the image on a display including the pixels with the changed color values" 416. Thereafter, the completed RGB images may be forwarded for further analysis and post-processing, and then storage, display, or further transmission. Other details of the process 400 are provided below.

Referring to FIG. 5, an example computer-implemented process 500 of video coding using an image data correction mask is provided, and process 500 relates to the operations on a transmitter side of a video coding system. In the illustrated implementation, process 500 may include one or more operations, functions or actions as illustrated by one or more of operations 502 to 524 numbered evenly. By way of non-limiting example, process 500 may be described herein with reference to example video coding systems or devices of any of FIGS. 3 and 15-17, and where relevant.

Process 500 may include "receive RGB video image data" 502, and by one form, the mask correction processes described herein operate in the RGB color space. It will be appreciated, however, it is possible for the mask to operate in other color spaces. In the examples provided herein, however, raw RGB data may be received from image capture devices that use a Bayer-type filter. The images may be pre-processed sufficiently for encoding such as with de-mosaicing so that all pixels have all three RGB values, noise reduction, and so forth to refine the RGB values. The mask operations may retrieve the images in their RGB form at this point. The images may be further, or separately, processed such as by conversion into another color space, such as YUV, as well as other pre-processing techniques for the encoding operations.

Process 500 may include "search for uniform color areas using RGB histograms" 504. Thus, the process searches for areas on an image that have two uniform color areas for example. The present process is particularly targeted to areas of an image with two uniform colors, which are most likely to be text of one color on a background of another color. It will be appreciated, however, the present processes are not limited to content that includes text as long as two uniform color areas are presented. More than two color areas could be analyzed as well except that the accuracy for additional uniform color areas may not be as high as with two uniform color areas.

By one approach, the two uniform colors may be scattered throughout an image and are not necessarily continuous in order for the mask correction processes herein to be useful. For example, letters of a word may not touch each other on the content of an image. Thus, the present processes may apply as long as two uniform color values are found on the image or a region on the image being analyzed.

Also, a search may be performed to determine whether an entire image is divided into two uniform colored areas and/or whether regions (regions of interest or ROIs) on the image are divided into two uniform color areas. Of course, a search for regions may result in finding the former (entire image divided into two colors) anyway.

Process 500 may include "set search region" 506, and this refers to determining whether a set region of the image has two, and only two for this example, uniform colors. The regions may be set in a number of ways. By one approach, a region is rectangular, and an image may be divided into fixed position rows and columns of regions, where each region may be 256×512 pixels by one non-limiting example. The size of the region is not necessarily fixed to a single size and may be different within the same frame or display, but otherwise may be any useful size as long as it is less than the size of the screen or display. Also, the size may be set differently from frame to frame depending on objects detected in the frame for example. By one approach, other search algorithms may be provided that use multiple runs that may be performed such that a first run uses a rectangle of a first size such as 100×100, and then when text is detected in a set number of consecutive rectangles (such as three), then a second run may be performed either widening the search such as with 200×200, and so on to see how large a rectangle can be formed, or narrowed such as to 50×50 to form small rectangles when desired to pinpoint the areas of text instead. Many others exist. These variations may be used with any of the examples provided below and not just the fixed rectangle example. In the current case with fixed rectangle positions, each region of the image is checked to determine whether it only has two uniform colors, and each region is then analyzed separately as described below.

Figure 7:
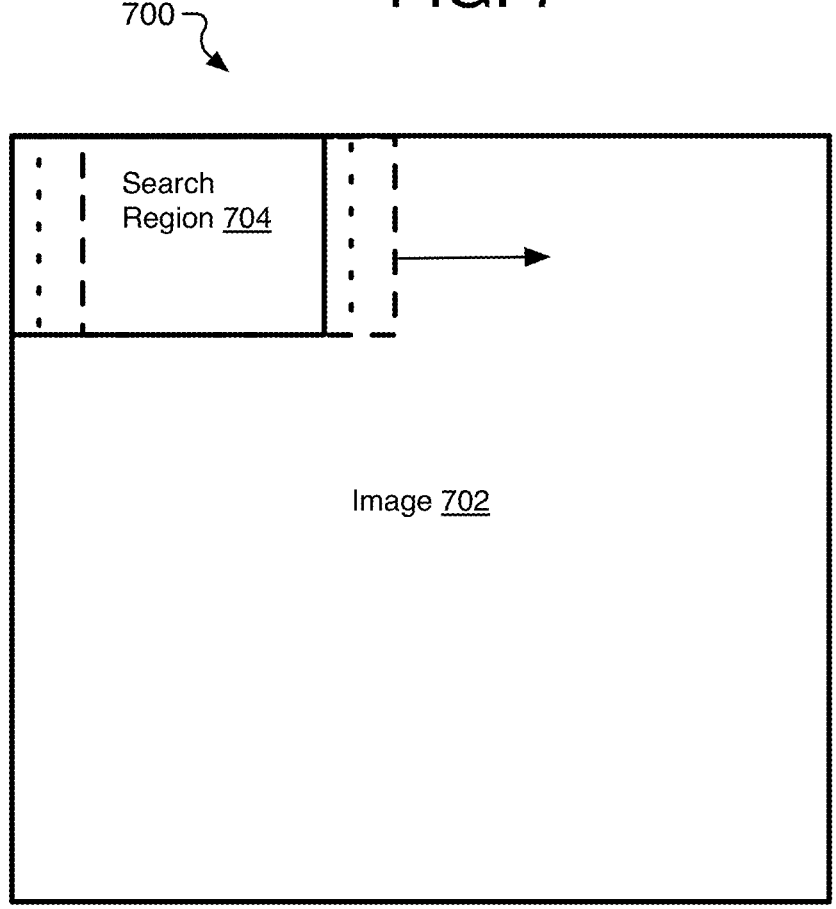
FIG. 7 is an illustrative diagram of an image with a search region used in accordance with the implementations herein.

Referring to FIG. 7 as another option, a frame 700 with an image 702 shows search region 704 that is a sliding rectangular window as shown on image 702. The window may be searched, and then moved to the next position, here to the right as shown in the dashed lines. The window may be moved to the right as shown by the arrow until the right end of the row is reached. Then the window may restart at the left side on the next row down so that it proceeds row by row down the image. Thus, the positions may overlap significantly, and may be moved one or a few pixels (or some other larger unit such as blocks or macroblocks) for each search or may be moved much farther so that there is no or little overlap from window position to window position. Many variations for moving the window exist. As mentioned, variable window or rectangle sizes may be used for the moving window.

By other options, the system may provide for a user input selection where the user selects each region occupied by text on a text based application. For example, when using a word processor program or notepad type program only on a small area of a screen, these areas can be selected by a user and the mask then can be applied directly to these regions.

Figures 10, 11:
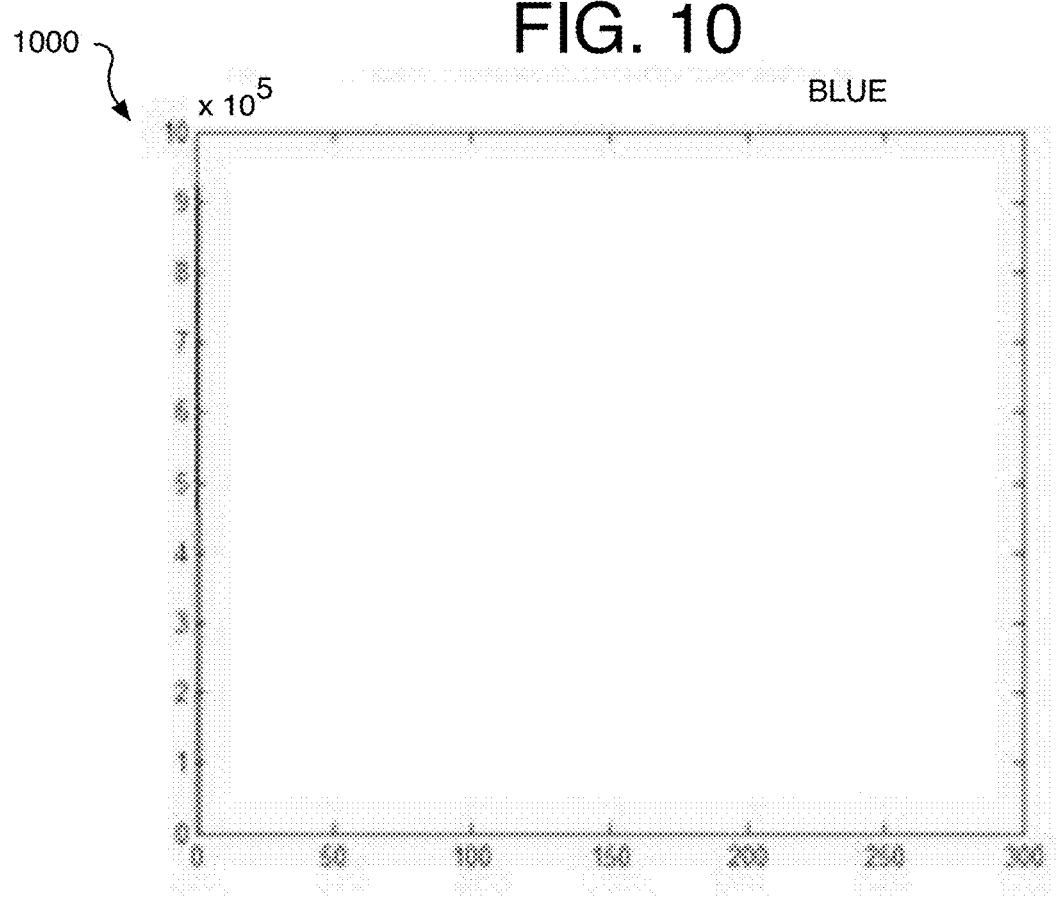
FIG. 10 is an illustration of another color component histogram used in accordance with the implementations herein.
FIG. 11 is an illustration of a map of an image data correction mask in accordance with the implementations herein.

Referring to FIGS. 8-10, process 500 may include "obtain histograms for search region" 508. Thus, whether the search is performed for an entire image or just for regions, three RGB color component histograms, one for each color, are obtained for the region being searched. The identification of the two uniform color areas then can be done by analyzing the histograms. Such histograms for all of the pixels on an image are conventionally obtained for pre or post-processing to determine brightness or color temperatures on the image by some examples.

To determine whether the image or region on an image has two uniform colors, one of the color component histograms for the image or region must have two uniform color peaks, and the other two color component histograms may have either one or two uniform color peaks. It should be noted that when one of the color value peaks is at zero, this may not show on the histogram, and it may appear that the histogram has a single peak when in fact there are two peaks (it is assumed all other pixels not counted have a value of zero). As mentioned above, uniform color or a uniform peak is when a single color value forms at the peak or the variance at the peak is very small such as merely 2, 3, 5, or 10 pixels out of the range of 0 to 255 possible color values for a single color component. The following table provides some examples to explain these histogram analysis parameters for the correction mask.

| | TEXT | | | BACKGROUND | | | HISTOGRAM PEAKS | | |
|---|---|---|---|---|---|---|---|---|---|
| COLOR | R | G | B | R | G | B | R | G | B |
| Black on White | 0 | 0 | 0 | 255 | 255 | 255 | 2 | 2 | 2 |
| Red on Green | 255 | 0 | 0 | 0 | 255 | 0 | 2 | 2 | 2 |
| Cyan on Yellow | 0 | 255 | 255 | 255 | 255 | 0 | 2 | 1 | 2 |
| Blue on Yellow | 0 | 0 | 255 | 0 | 255 | 255 | 1 | 2 | 1 |
| Violet on red | 255 | 0 | 255 | 255 | 0 | 0 | 1 | 1 | 2 |
| Random | 87 | 217 | 57 | 42 | 76 | 253 | 2 | 2 | 2 |

Red text on a green background is provided on the examples histograms 800, 900, and 1000 on FIGS. 8-10. The horizontal axis shows the color component value, and the vertical axis shows the number of pixels that have any certain color component value. So for the red text, there is one peak at 255 on the red component histogram showing many pixels have this value or sufficiently close to it to satisfy the uniform color peak criteria. A line was placed at color value 0 in the red color component histogram to show a peak at zero for the green background to be more accurate, but as mentioned, this peak may not show up at all depending on how the histogram is formed.

The same applies to the green color component histogram 900, where a peak for the uniform green color component is shown at 255, and again a zero value peak is shown for the red text.

Since both the red text and green background have a zero blue value, a single large peak appears at zero on the blue component histogram 1000, which results in a single peak for this blue component histogram. The table above shows other examples for some of the primary colors and most common usages such as black on white, and the number of peaks that would show on each color component histogram.

Then process 500 may include a check "histograms indicate uniform color areas?" 510, and if not, the process loops to obtain the next region, and when all regions on an image are analyzed, then the next image may be obtained 510. Otherwise, the mask is then constructed for the two uniform color areas as follows.

Referring to FIG. 11, process 500 may include "form map for mask" 512. Particularly, a binary mask or map can be created by assigning one bit value 1 or 0 to the pixels of one of the uniform color areas and the other bit to the pixels of the other uniform color area. An example map 1100 may provide each pixel in black as a 1 while each pixel in white as a zero. Those few pixels in the region searched that do not have either color value may be assigned a bit of the color value it is closest to in color value (smallest difference in color value). This binary map then can be easily entropy encoded if so desired, but whether encoded or not, the binary map results in a relatively small data payload to be communicated to the sink. This would not result in significant overhead and is hence very practical.

Process 500 may include "obtain pixel locations of each area" 514. Thus, to construct the map, the pixel locations of each uniform color peak is obtained from the data forming the histogram for example, or another listing of the pixels and their color values in the RGB image data. When a region is being used, the pixel location of the start of the region, such as the upper left corner, is noted and is always considered the predetermined starting location for each region. Since the region will have a known fixed size such as with a predetermined number of pixels in each row and a predetermined number of rows, process 500 may include "list locations by code" 516, which refers to assigning one of the binary bits to each pixel as mentioned by starting at the predetermined starting location in the upper left corner of the region, proceeding left to right down each row, and then to the next lower row. This results in a string of binary bits where only the starting coordinate needs to be remembered. This process may be repeated for each region found to have two uniform color areas.

It will be understood that when the entire image is found to have two uniform color areas without using regions, then no coordinates may be needed at all as long as the starting point of the map is remembered, such as the upper left corner pixel of the image. It will be appreciated that many other variations for the starting points of the image map or region map may be used as well.

Process 500 may include "obtain RGB color value(s) for each area" 518. Thereafter, color values to be used to modify the color values of the uniform color areas of a corresponding decompressed image at a receiver may be determined. This may be determined in a number of different ways, two of which are provided as follows.

Process 500 may include "compute average color value for each area" 520, and by this approach, a single correction color value is determined for one or both uniform color areas by taking an average of all of the color values of the pixels that respectively form each area. Alternatively, the averages may be formed by using color values from less than all of the pixels in each area, such as some sampling instead. An average correction color value may be determined or each RGB color component as well as for each uniform color area, for a total of six values, each in a range of 0 to 255 for RGB color space. The average correction color values may be stored where it is accessible for transmission as part of the mask image data.

By another option, process 500 may include "obtain individual pixel color values for each area" 522, and by this implementation, a sampling of pixel color values in each area are obtained to be used as correction color values. This may include obtaining color values of X samples or target pixels at Y intervals by row and column, whether within an entire image or in each region found to have the two uniform color areas within a single image. Otherwise, each separate area (with one of two uniform colors such as separate letters in a word forming the content of the area) may have a color value of at least one sample pixel in that separate area as the correction color value for that separate area. Many variations are possible. The correction color values may be used separately or combined to replace or modify decompressed color values in the two uniform areas on the receiver side. The use of the individual sample color values is explained in detail below with operation 622 on the receiver side.

By one approach using a sliding window to detect the two uniform colors for example, the window moves along the portions of the image. As mentioned above, if new color peaks appear in the histogram, it is understood that new content with two uniform colors is present. In this case, thereafter, it is determined where two peaks appear continuously until a last position where the original distinct peaks were present may be taken as the last position of the two uniform color pixels for a given set of colors. Then, the search algorithm may reduce the search window to refine the area to include all text pixels of the determined continuous area of the said uniform colors. The new set of colors for a new region then may be determined from the new region defined by new peaks in the histogram from where the search algorithm left off. The coordinates of the individual pixels in these detected regions become the sample points and may be transmitted to the receiver in the mask image data. When the color values of the sample pixels are generated, these also become part of the mask image data to be transmitted to the receiver. On the receiver, the colors are applied based on the coordinates determined by the transmitter by this process.

By yet another option, no correction color values are intentionally transmitted with the mask image data, and correction color values used to modify or replace the decompressed color values at a receiver are computed at the receiver using the RGB values obtained from the decompression. Otherwise, the receiver may have the ability to compute or obtain the color values when color values are expected from a transmitter along with the compressed image data but are not received due to network traffic or other issues. The details are provided below with process 600 on the receiver side.

Process 500 may include "transmit mask image data" 524, and therefore, the mask image data including a list of binary code forming the map, coordinates when regions are used, and correction color values when obtained or computed on the transmitter side all may be placed in a bitstream to transmit the mask image data to a receiver that is decoding the image or images encoded and based on the same images analyzed to form the color correction mask. As mentioned above, the mask image data may be transmitted in a number of different ways. This includes providing the mask image data to the encoder to be at least entropy coded and then placed in the packets and the bitstream with the other compressed image data, such as the YUV color and luminance values, residuals, motion vectors, and so forth. Alternatively, or additionally, the uncompressed mask image data may be provided directly to the multiplexer to be placed in packets to be transmitted with packets of the other compressed image data. Otherwise, whether compressed or not, the mask image data may be transmitted by a separate bitstream with a band width separate from the band width used for the bitstream of the other compressed image data from the encoder. Other variations are possible as well.

Referring to FIG. 6, an example process 600 of video coding using an image data correction mask is provided, and process 600 relates to the operations on a receiver (or sink or decoder) side of a video coding system. In the illustrated implementation, process 600 may include one or more operations, functions or actions as illustrated by one or more of operations 602 to 624 numbered evenly. By way of non-limiting example, process 600 may be described herein with reference to example video coding systems or devices of any of FIGS. 3 and 15-17, and where relevant.

Process 600 may include "receive compressed image data and mask image data" 602. As mentioned, this may include receiving input from a transmitter that could be streaming from an external network such as the internet, or otherwise may obtain the video (or AV) sequence from memory on or accessible to the receiver. This operation refers to receipt of the video (or AV) bitstream by the receiver. As described above, the compressed image data as input may be provided as images or frames that are encoded, and may be video sequences or individual photos. The data may be provided in the form of packets associated with each frame.

It will be understood that this operation, as well as many of the others described below, may be operating continuously or as needed while the video (or AV) is being streamed from the source/transmitter device to the sink/receiver device and being played while the video (or AV) is being streamed. By one form, the transmitter and receiver are in the same room or otherwise in close proximity (whether or not in the same room) and are paired in a PAN or mirroring network as already described herein. Other arrangements may be used.

Process 600 may include "extract compressed image data" 604, such that the compressed image data including luminance and color values, residuals, motion vectors, and so forth may be extracted from the bitstream, or more specifically, from the frame or image packets. The data then may be provided to a decoder so that process 600 may include "decompress images" 606. The image data may be decompressed resulting in YUV pixel data for each image or frame. Thereafter, the process 600 may include "convert images to RGB data" 608, which may occur whether or not the correction mask is being used due to display systems that need to receive RGB color space image data. This operation includes conversion algorithms being applied to the YUV color space image data to convert the image data to RGB color space values for each or individual pixels. As mentioned above, when the compression and decompression remains in the RGB color space, then the color space conversions are omitted.

Process 600 may include "extract mask image data" 610 which includes extracting the mask image data from packets in a bitstream either in the bitstream with the other compressed image data or a bitstream separate from that used by the other compressed image data. If mask image data was encoded with entropy coding, this coded mask image data also may be decompressed with de-entropy coding to reconstruct the values of the mask image data. The mask image data may include the map for a single image or multiple maps with one map per region when regions are used, coordinates when the maps are based on regions, and color values when provided.

Process 600 may include "apply map to RGB images to determine location of pixels in area(s)" 612. Such a map 1100 (FIG. 11) where the black (in text) may have pixels with is for example, and surrounding white background would have pixels with 0s. For this operation, process 600 may include "align map to image" 613. When there is a single map for an entire image, the bits of the map are matched to the pixel locations starting with the upper left pixel for example, and proceeding one-by-one left-to-right, and downward row-by-row until each pixel on substantially the whole image or at least part of the image is assigned a bit from the map, an in turn, is assigned to one of the two uniform color areas. The map may have a predetermined size including a certain number of bits in a row and a certain number of rows to match the size (or resolution) of the image or a part of the image. Alternatively, a listing of bits and pixels that form the map may be formed by using coding techniques so that a bit is not listed for every pixel. Thus, a code may be provided to indicate an entire row is 1s for example. BY one example, this is performed by using run-length encoding. The result is that the location of the two uniform color areas is established, and which pixels form those two areas is established.

When regions of known or fixed sizes on an image are mapped separately, coordinates of the upper left corner of a region are provided and extracted as part of the mask image data. The map for that region begins at that corner and then proceeds for a predetermined number of pixel locations for each row, such as left to right, and then downward row-by-row. It will be understood, however, that other shapes and patterns for the map may be used as long as the arrangement of the map is predetermined so that the initial formation of the map on the transmitter side matches the reconstruction of the map on the receiver side. Also, as mentioned with the entire image map, region maps may have codes on the map to reduce the number of bits used for the map.

Process 600 may include "modify color value of pixels in areas" 614. Once the pixels have been assigned to one of the uniform color areas, the RGB color values of the pixels obtained from the decompression may be corrected by using correction color values associated with the two uniform color areas mapped by the mask. By one approach, whether the color values of the pixels actually need correction is ignored, and by this form, the color values of the pixels are corrected mainly due to their location within the area. Thus, by one example, all pixels of each area have their color values modified or replaced. By another example, only those color values within some range of the edge of one or both of the areas may be corrected. For example, an area that is text may be entirely corrected while the other area that is background may be corrected only near (within a certain number of pixels for example) the edges of the text. By yet another alternative, however, the decompressed color values are determined, and only those pixels with color values that are not within a certain range of the new color values associated with the two uniform color areas are corrected.

A number of alternative techniques may be used to correct the color values. As mentioned above, by one example, process 600 may include "retrieve extracted area color values" 616 referring to the correction color values formed at the transmitter and transmitted to the receiver as part of the mask image data. In this case, the transmitted correction color values may include a single color value average for each uniform color area for the whole image, or for each region in the image with a mask.

The transmitted correction color values may additionally or alternatively include multiple individual correction sample or target pixel color values from each of the two uniform color areas that form a mask. The number and location of these correction sample pixels are explained above and may be obtained as part of the transmitted mask image data. When this latter option is used, the mask image data also may include the coordinates of those selected pixel locations with transmitted correction color values, and used as explained above and below.

Process 600 may include "obtain color values using values from decompression" 618. Alternatively, or additionally, when the receiver does not provide all of the needed correction color values either intentionally or unintentionally as when data is dropped due to network congestion, problems at the transmitter, and so forth, then the correction color values for the uniform color areas may be obtained or computed on the receiver side instead. In this case, color values of all pixels or color values of just a certain sampling of pixels of the two uniform color areas, as obtained from decompression, may be used to compute an average color value for each area (and for each color component). Otherwise, coordinates of individual correction target or sample pixel locations (or all pixel color values as mentioned above) of the two uniform color areas may be obtained, and provided for color correction also as explained below.

Process 600 may include "replace previous color value with average color value depending on area" 620. The average color values may be obtained from the extracted mask image data. Otherwise, the average color values may be computed on the receiver side by taking the RGB color values of a sampling, or all, pixels in one of the areas obtained by decompression, and summing the values of the same color component and then dividing by the number of sample pixels used. By one example, the average color value, whether computed on the transmitter side or receiver side, replaces the previous RGB color values obtained from the decompression and in each area. By one form, all or substantially all pixels of the two uniform color areas receives the replacement average color value. By other forms, only those pixels within a certain range of pixels to the edges of the two uniform color areas or other criteria receives the new average value(s). Many variations are possible. The color value replacement or modification is performed for each color component.

Figure 12:
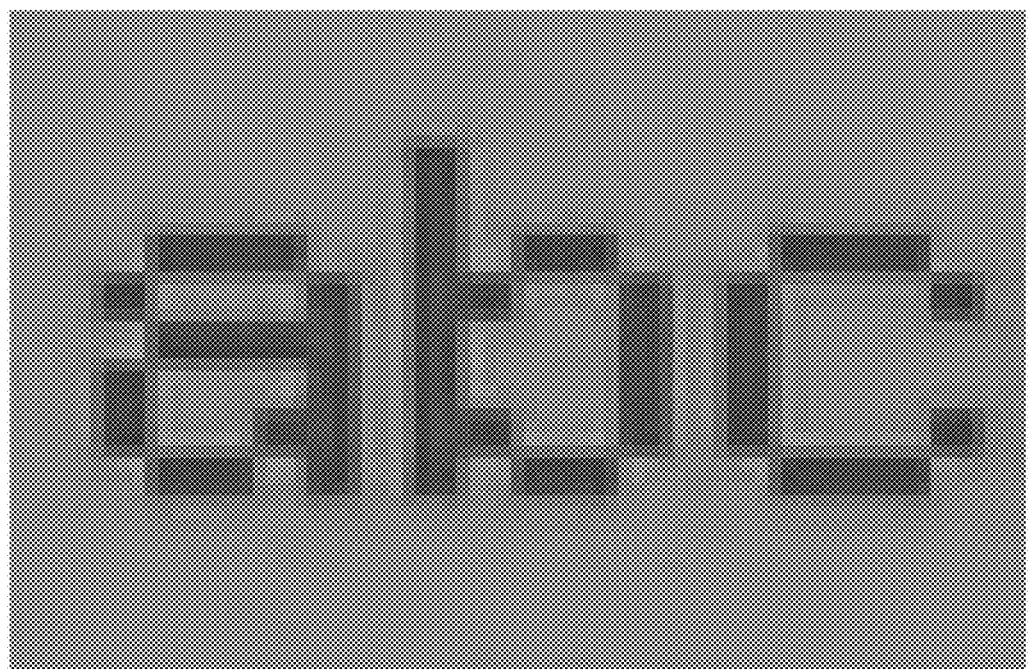
FIG. 12 is a close-up of a text area of an image showing the results of using an image data correction mask in accordance with the implementations herein.
Figure 13:
FIG. 13 is another close-up of a text area of an image showing the results of using a color correction mask in accordance with the implementations herein.

Referring to FIGS. 12-13, process 600 may include "use individual pixel color values to replace color values of the areas" 622. This operation may be used because it can be seen that while the use of average values for the text reconstruction may result in well-formed characters, due to the coding process, however, loss in the color fidelity of the pixel values may still exist. Thus, some of the text still may have some noticeable discoloration as shown on image 1200. It should be noted that some of the additional color at the edges of the text is due to the extreme close-up image and would not be there on normal size text and so can be ignored there. Image 1300 was constructed by using individual pixel color values, which provides better fidelity such that using the individual pixel color values may be preferred over using average color values.

Thus, by one form, the color values of the selected individual pixels of the two uniform color areas is obtained and may be spaced evenly throughout the areas or may be at selected pixel intervals from each other in both row and column distances for example, and as explained above. Then, pixels within the two areas may be assigned the color value of the closest sample pixel. Other alternatives, include using only these sample pixel locations to compute an average color value for each area. Otherwise, a one-way or two-way interpolation algorithm, whether weighted or not, may be used to compute the color value for a pixel in the two areas by using the color values of the four closest sample pixel locations that form a rectangle around the pixel location being analyzed. This could be used when the text does not have a uniform color for example.

By other alternatives, a combination of the replacement color values and the color values from decompression may be averaged or otherwise combined to find a final color value for a pixel. Otherwise, an average difference between the replacement and decompression values may be obtained for each area and then applied by adding it to the pixels of each area.

It will be understood that this process may be repeated for each region of an image, and then each image or frame of a video sequence when so provided. By other forms, not all regions in an image are searched and corrected, and/or not all frames of a video sequence are searched and corrected. Other intervals may be used such as every 'x' frames, or every other frame, or every $5^{th}$ frame, and so forth when efficiency is a priority. Otherwise, it may be found that it is more efficient to correct certain types of frames such as B-frames or P-frames, but not I-frames, or any other desired variation.

Thus, process 600 may include "provide corrected image(s)" 624, and once corrected by the masks, the RGB color space images may be provided to a renderer with a display for example for further post-processing as needed, and then display, storage or further transmission.

The result is a higher quality image with corrected pixel color values that provide clear crisp edges where one uniform color meets another uniform color on an image, such as with text on a background of a different color.

The mask further acts as confirmation of the text content and could potentially be used as a check to confirm if a malicious attack on the transmitted text content is made. For example, the use of the mask may show that certain text has been changed in certain ways indicating an intentional undesired change in the text. If the mask used does not match with the content, then it would be visually noticeable that there is an issue. Alternatively, the same algorithm for mask creation can be applied at the receiver and create a verification mask. If the transmitter mask differs from the receiver mask by a certain amount, it can be determined that that the received content has been compromised.

Figure 14:
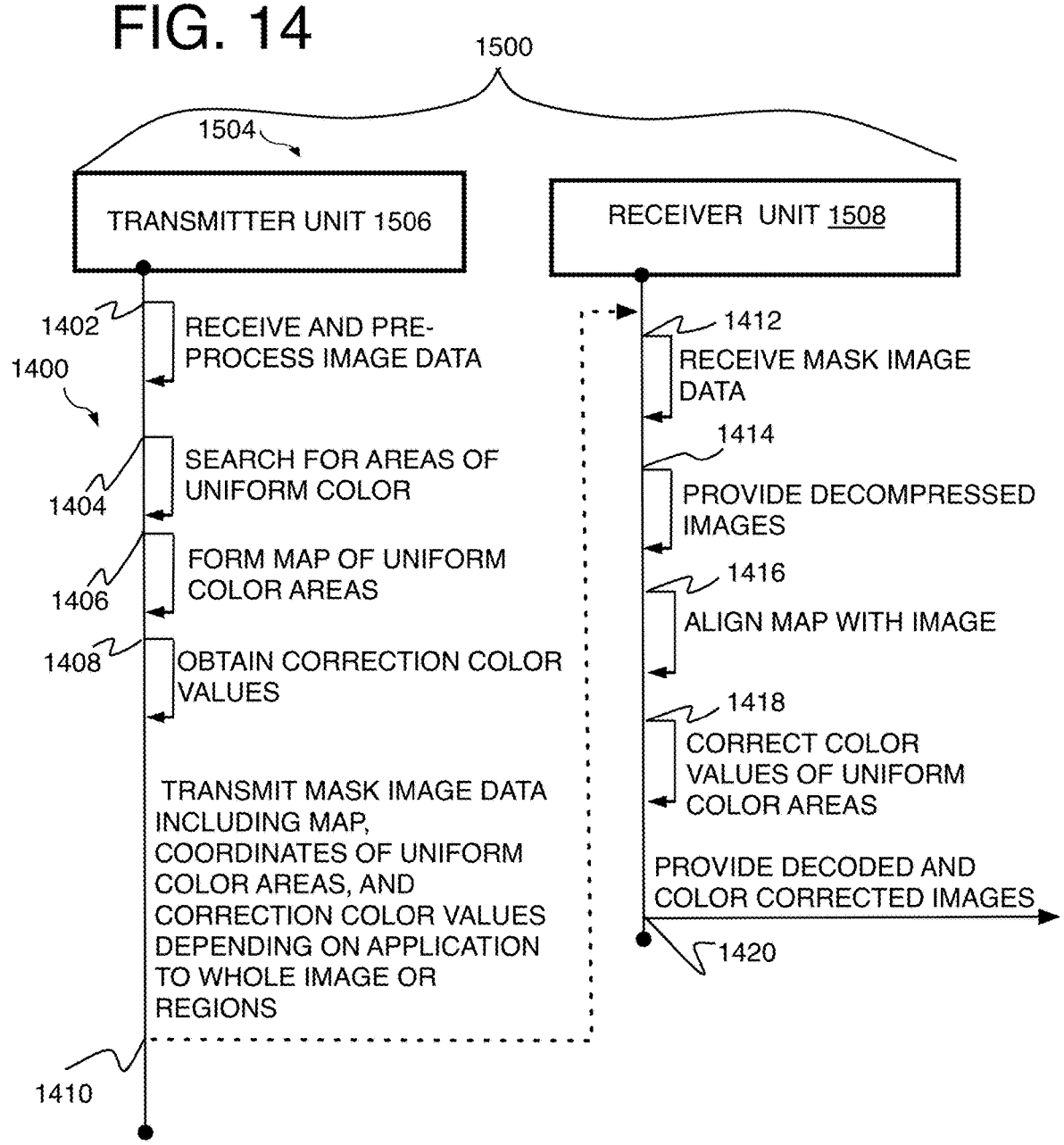
FIG. 14 is an illustrative diagram of a video processing device in operation and performing a method of video coding using an image data correction mask in accordance with the implementations herein.

Referring to FIG. 14, by another approach, process 1400 illustrates the operation of a video processing device 1500 that performs video coding using an image data correction mask in accordance with at least some implementations of the present disclosure. In more detail, in the illustrated form, process 1400 may include one or more operations, functions or actions as illustrated by one or more of actions 1402 to 1420 numbered evenly. By way of non-limiting example, process 1400 will be described herein with reference to FIG. 15. Relevant here, device 1500 includes logic units 1504 including either a transmitter unit 1506, a receiver unit 1508, or both so that the device can either transmit or receive. Thus, process 1400 may be considered to describe a process using two of the devices 1500, one transmitting and one receiving. One possible form may include using a PAN system where one device 1500 may be a smartphone to transmit and another device 1500 may be a television to receive for example. The transmitter unit 1506 may have a pre-processing unit 1510, encoder(s) 1512, and a correction mask unit 1514 with a region setting unit 1516 and a mask creation unit 1518 as described herein. The receiver unit 1508 may have a bitstream receiver/de-multiplexer unit 1520, decoder(s) 1522, mask image data application unit 1524, and an AV processing/rendering unit 1526. The operation of the device 1500 may proceed as follows.

Process 1400 may include "receive and pre-process image data" 1402, and particularly, receiving the encoded video or AV signals (which may be provided as frames or packets that form frames). The image data may be received in a color space compatible with the correction mask operations herein. It will be appreciated that the correction mask operations may be applied to single still photos or a video sequence, and may apply to each frame in a video sequence but could apply to some interval of frames, such as every other frame, every $5^{th}$ frame, and so forth. The operations also may apply to all regions in a frame or may be limited to only certain regions such as a center area or outer frame area (e.g., non-center) of an image. Many variations are possible.

The process 1400 then may include "search for areas of uniform color" 1404, and as explained above, an entire image may be searched as a single unit, or different regions may be searched where the regions may have fixed positions or may be formed by a sliding window. Each region may have its own mask or map in this case. As mentioned, one uniform color area may be text and the other the background for the text but this need not always be the case.

By one example provided above, histograms may be used to search the image or each region of the image, where a combination of the number of peaks on each color component histogram for a region or image indicates whether two uniform color areas exist on the image or region, where uniform can refer to a single color value of a total range of available color values for each component, or may refer to a small range or variance on that total range. The color space may be the RGB color space but other color spaces are possible. By one form, two uniform color areas are established for a three color component color space when one color component histogram has two peaks and the other two color component histograms has one or two peaks. This includes a peak at the zero value when zero is included in a color value range of the color space.

The process 1400 may include "form map of uniform color areas" 1406. By the example mentioned above, a binary map is used since it is easily compressed and transmitted and has a relatively low bit cost. Thus, it is determined which uniform color area a pixel belongs to by using the color value per pixel data used to form the histograms. Each pixel found to be in one uniform color area is assigned one of the binary digits (1 or 0), and the pixels found to be in the other uniform color area is assigned the other digit. By one example, those pixels with color values not in either peak of the histogram is placed in the area with the closest color value to its own color value. When a color value actually has three component values, this may be performed by taking the least total difference or the least Euclidean distance for example.

The process 1400 then may include "obtain correction color values" 1408, and as mentioned, this may include computing a color value average of all (or a sampling of) pixels in each uniform color area, or selecting a sampling of individual correction pixel color values to be used for computations or color value modification on the receiver side. Otherwise, this operation may be omitted altogether, intentionally or intentionally as mentioned above, when the color values are to be determined using decompressed color values on the receiver side.

The process 1400 may include "transmit mask image data including map, coordinates of uniform color areas, and correction color values depending on application to whole image or regions" 1410". It will be understood that at least the map is provided, but coordinates need only be provided when regions less than an entire image is used as the searching unit for two uniform color areas. Also as mentioned, the color values may or may not be transmitted from the transmitter or source (or encoder side).

The process 1400 may include "receive mask image data" 1412, also as explained above, the mask image data may be received by a receiver or decoder that also receives compressed image data in a bitstream that is to be corrected by the mask, and that the mask image data may arrive by different ways. This may include as coded by an encoder and in the same bitstream as the other compressed image data, packetized and placed in the same bitstream as the other compressed image data except without being compressed, and/or being placed in a separate bitstream with a separate band width. Also as mentioned, the present mask operations may apply to small networks such as PANs as well as larger networks whether cellular, WiFi, satellite, or others. The details are explained above.

The process 1400 may include "provide decompressed images" 1414. The images or frames are extracted from the bitstream and decoded to their uncompressed or reconstructed form. The images may be converted to another color space for compatibility with rendering devices or components as well as compatibility to the correction mask operations.

The process 1400 may include "align map with image" 1416. Here, the map may be aligned with pixels of a decompressed image starting with one of the corners or other certain predetermined alignment point of the image when the entire image is to receive the single map, and the two uniform color areas fill substantially the entire image. Otherwise, a corner, such as the upper left corner of a region may be the predetermined starting point of a region of predetermined size. The map, with a fixed number of rows and columns of binary values can be matched to the pixels in the region on the decompressed image. This indicates which pixels are in which uniform color area.

The process 1400 may include "correct color values of uniform color areas" 1418, and as described above, whether the values are transmitted from an encoder/transmitter side or computed (or selected) on the decoder/receiver side using decompressed color values, an average color value for each uniform color area may be used to replace or modify the color values of the pixels in that area, and this may apply to all of the pixels or only pixels in certain locations on the area. Likewise, when color values of individual pixels of the two uniform color areas is used instead, and as mentioned, pixels near each sampling may have their color value changed to that of the sampling or some other combination such as an interpolated value may be formed by using sample color values near the pixel being analyzed for example. Many variations are possible.

The process 1400 may include "provide decoded and color corrected images" 1420. Once the images are corrected, the images may be stored, further post-processed, displayed on a display device which may be the receiver, or transmitted to another device to perform any of these tasks.

It will be understood that these operations may be repeated for each or selected regions on an image, or each image, or other interval, until a video sequence is completed. The correction mask operations may be provided while the video sequence is streaming from a transmitter device to a receiver device, or may be used once a video sequence is already downloaded to one of these devices. Other examples are contemplated.

It will be appreciated that processes 400, 500, 600, and/or 1400 may be provided by sample video processing systems 300, 1500, 1600, and/or 1700 to operate at least some implementations of the present disclosure. In addition, any one or more of the operations of FIGS. 4A-4B, 5, 6, and 14 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 15:
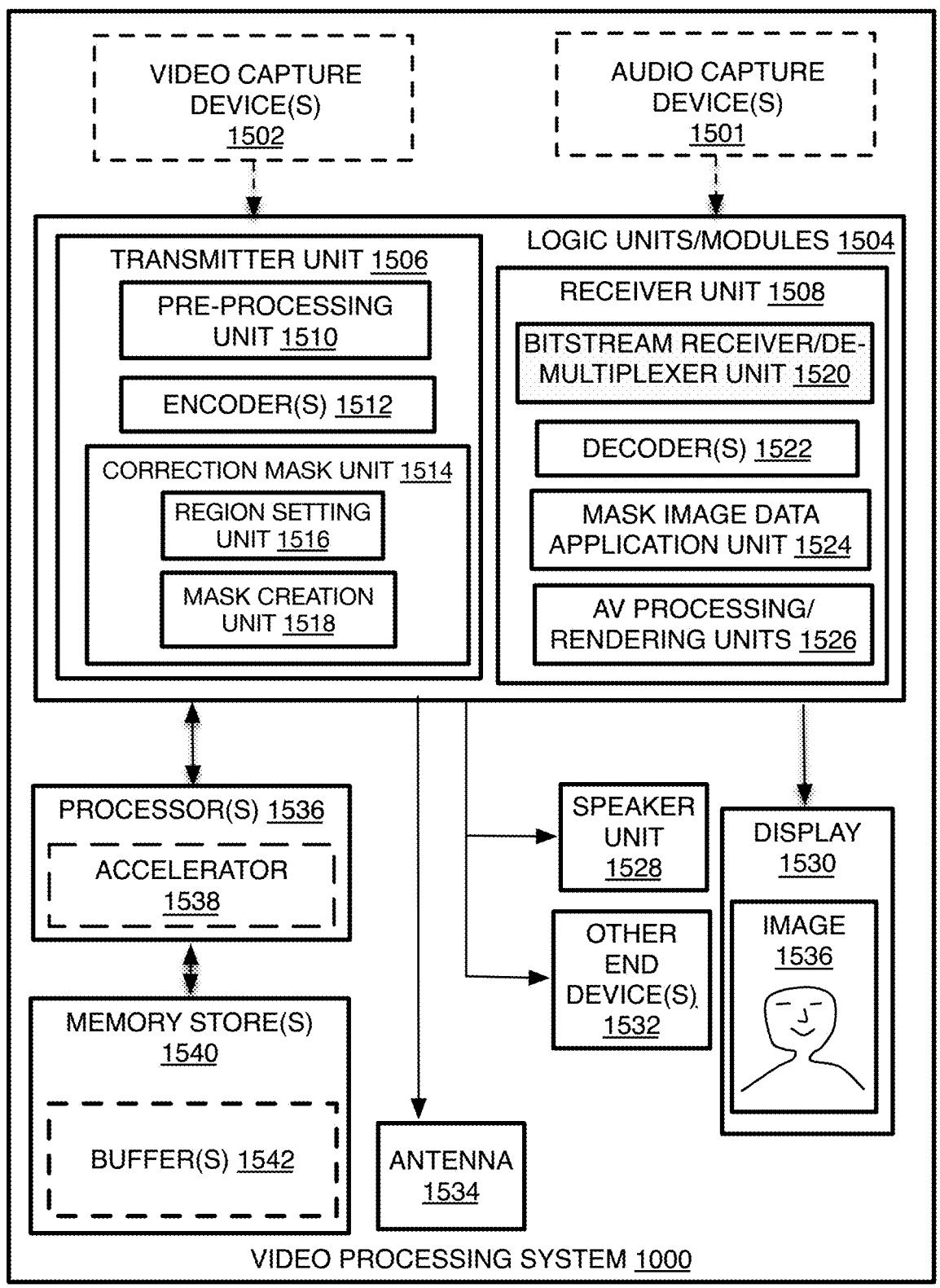
FIG. 15 is an illustrative diagram of an example system.

Referring to FIG. 15, an example video (or AV) processing system or device 1500 is arranged in accordance with at least some implementations of the present disclosure. The system 1500 may be have a receiver, a transmitter, or both described in detail herein. The device 1500 also may be referred to as an encoder, a decoder, or video providing device such as an image display device (television, computer, smartphone, tablet, and so forth).

In various implementations, the example video processing system or receiver 1500 may have a video capture device(s) 1502 and optionally an audio capture device(s) 1503 so that the receiver can act as a transmitter to form or receive AV data if desired. This can be implemented in various ways. Thus, in one form, the video processing system 1500 is a device, or is on a device, with a number of cameras, and may also have microphones. In other examples, the video processing system 1500 may be in communication with one or a network of cameras (or microphones), and may be remote from these devices such that logic modules 1504 may communicate remotely with, or otherwise may be communicatively coupled to, the cameras (and microphones) for further processing of the captured video data (with or without audio data).

The system 1500 may have one or more video capture or imaging devices 1502 such as cameras for capturing images either alone or along with capturing audio. Such technology may include a camera such as a digital camera system, a dedicated camera device, or an imaging phone or tablet, camera that provides a preview screen, or some combination of these. Thus, in one form, imaging device 1502 may include camera hardware and optics including one or more sensors as well as auto-focus, zoom, aperture, ND-filter, auto-exposure, flash, and actuator controls. These controls may be part of a sensor module or component for operating the sensor that can be used to generate images for a viewfinder and take still pictures or video. The imaging device 1502 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)) in addition to, or instead of, the use of a red-green-blue (RGB) depth camera and/or microphone-array to locate who is speaking. The camera sensor may also support other types of electronic shutters, such as global shutter in addition to, or instead of, rolling shutter, and many other shutter types. In other examples, an RGB-Depth camera and/or microphone-array might be used in the alternative to a camera sensor. In some examples, imaging device 1502 may be provided with an eye tracking camera. The type of camera and image format is not particularly limited as long as a mask can be provided in a color space as described herein.

As to the audio, such technology not already mentioned above also may include a dictation machine or other sound or video and audio recording machine, a mobile device, or an on-board device, or any combination of these. Thus, in one form, audio capture device 1503 may include audio capture hardware including one or more sensors as well as actuator controls. These controls may be part of a sensor module or component for operating the sensor. The sensor component may be part of the audio capture device 1503, or may be part of the logical modules 1504 or both. Such sensor component can be used to convert sound waves into an electrical acoustic signal. The audio capture device 1503 also may have an A/D converter, other filters, and so forth to provide a digital signal for acoustic signal processing.

In the illustrated example, the device 1500 may have logic units or modules 1504 that has a receiver unit 1506 and/or a transmitter unit 1508. The transmitter unit 1506 may have a pre-processing unit 1510 for modifying raw image data into data sufficient for encoding, including conversion to a certain color space such as RGB to YUV, at least one encoder 1512 to compress the video data (and audio if provided), and a correction mask unit 1514 with a region setting unit 1516 and a mask creation unit 1518 that performs the tasks of determining uniform color areas on an image or region on an image, and forming a mask with mask image data that may include a map of the areas, coordinates of regions, and correction color values as described above.

The receiver unit 1508 may have a bitstream receiver/de-multiplexer unit 1510 that receives a transmitted bitstream of video or AV data over antenna 1534 for example, and de-multiplexes the data into separate audio and video frames with audio and video packets respectively as well as mask image data packets when so provided. The receiver unit 1508 also may include one or more decoders 1522, a mask image data application unit 1524 to perform the tasks described in detail above to apply the map of the mask to an image and change the color values of pixels in the uniform color areas according to the mask, and a video or AV processing and rendering unit 1526 that may display video on display 1530, and also may emit audio signals from speaker unit 1528 for example.

The system 1500 may have one or more processors 1536 which may include a dedicated accelerator 1538 such as the Intel Atom, memory stores 1540 which may or may not hold buffers 1542 including buffers for images in various stages along the video coding process on either the transmitter or receiver side or both. This may include buffers to hold RGB images being used to form the mask on the receiver side as well as RGB images both before and/or after color correction by using the mask. Otherwise, the video processing system or device 1500 may include at least one speaker unit 1528 to emit audio when desired, the one or more displays 1530 to provide images 1536 when desired, any other end device(s) 1532, and antenna 1534 as already mentioned above. In one example implementation, the image processing system 1500 may have the at least one processor 1536 communicatively coupled to the transmitter unit 1506 and/or receiver unit 1508, and at least one memory 1524. The antenna 1534 also may be provided to transmit other commands to a paired device or other devices. As illustrated, any of these components may be capable of communication with one another and/or communication with portions of logic modules 1504. Thus, processors 1536 may be communicatively coupled to the antenna 1534, the logic modules 1504, and the memory 1524 for operating those components.

Although the device 1500, as shown in FIG. 15, may include one particular set of blocks or actions associated with particular components or modules, these blocks or actions may be associated with different components or modules than the particular component or module illustrated here.

Figure 16:
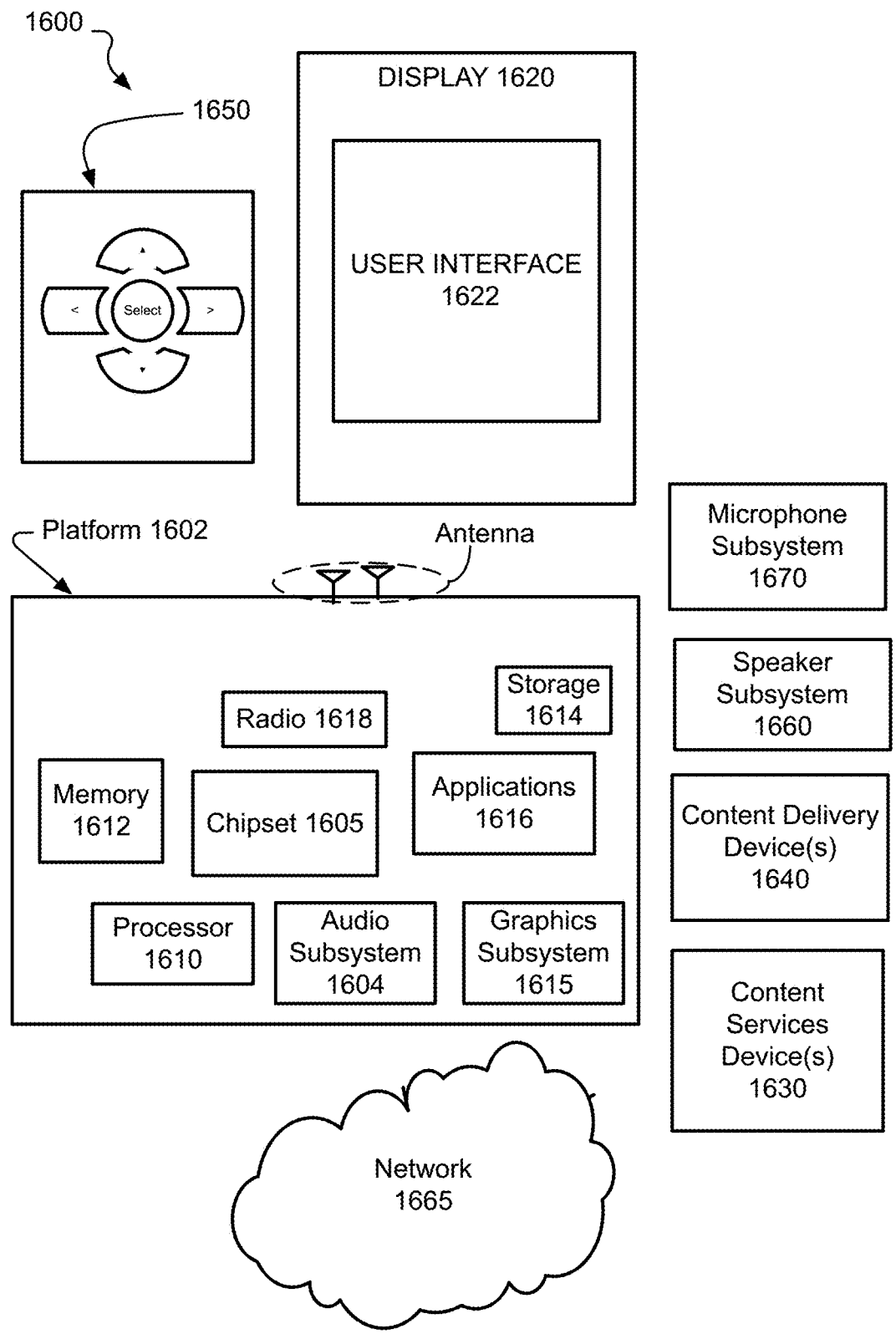
FIG. 16 is an illustrative diagram of another example system.

Referring to FIG. 16, an example system 1600 in accordance with the present disclosure operates one or more aspects of the audio processing system described herein and may be either a transmitter (source) or receiver (sink) (or both) as described herein. It will be understood from the nature of the system components described below that such components may be associated with, or used to operate, certain part or parts of the audio processing system described above. In various implementations, system 1600 may be a media system although system 1600 is not limited to this context. For example, system 1600 may be incorporated into one or more microphones of a network of microphones, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth, but otherwise any device having an acoustic signal analyzing device, and often a display device as well.

In various implementations, system 1600 includes a platform 1602 coupled to a display 1620. Platform 1602 may receive content from a content device such as content services device(s) 1630 or content delivery device(s) 1640 or other similar content sources. A navigation controller 1650 including one or more navigation features may be used to interact with, for example, platform 1602, speaker subsystem 1660, microphone subsystem 1670, and/or display 1620. Each of these components is described in greater detail below.

In various implementations, platform 1602 may include any combination of a chipset 1605, processor 1610, memory 1612, storage 1614, audio subsystem 1604, graphics subsystem 1615, applications 1616 and/or radio 1618. Chipset 1605 may provide intercommunication among processor 1610, memory 1612, storage 1614, audio subsystem 1604, graphics subsystem 1615, applications 1616 and/or radio 1618. For example, chipset 1605 may include a storage adapter (not depicted) capable of providing intercommunication with storage 1614.

Processor 1610 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1610 may be dual-core processor(s), dual-core mobile processor(s), and so forth.

Memory 1612 may be implemented as a volatile memory device such as, but not limited to, a Random Access Memory (RAM), Dynamic Random Access Memory (DRAM), or Static RAM (SRAM).

Storage 1614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1614 may include technology to increase the storage performance enhanced protection for valuable digital media when multiple hard drives are included, for example.

Audio subsystem 1604 may perform processing of audio. The audio subsystem 1604 may comprise one or more processing units, memories, and accelerators. Such an audio subsystem may be integrated into processor 1610 or chipset 1605. In some implementations, the audio subsystem 1604 may be a stand-alone card communicatively coupled to chipset 1605. An interface may be used to communicatively couple the audio subsystem 1604 to a speaker subsystem 1660, microphone subsystem 1670, and/or display 1620.

Graphics subsystem 1615 may perform processing of images such as still or video for display. Graphics subsystem 1615 may be a graphics processing unit (GPU) or a visual processing unit (VPU), for example. An analog or digital interface may be used to communicatively couple graphics subsystem 1615 and display 1620. For example, the interface may be any of a High-Definition Multimedia Interface, Display Port, wireless HDMI, and/or wireless HD compliant techniques. Graphics subsystem 1615 may be integrated into processor 1610 or chipset 1605. In some implementations, graphics subsystem 1615 may be a stand-alone card communicatively coupled to chipset 1605.

The audio processing techniques described herein may be implemented in various hardware architectures. For example, audio functionality may be integrated within a chipset. Alternatively, a discrete audio processor may be used. As still another implementation, the audio functions may be provided by a general purpose processor, including a multi-core processor. In further implementations, the functions may be implemented in a consumer electronics device.

Radio 1618 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), wireless display (WiDis) to establish Pan or mirroring networks, cellular networks, and satellite networks. In communicating across such networks, radio 1618 may operate in accordance with one or more applicable standards in any version.

In various implementations, display 1620 may include any television type monitor or display. Display 1620 may include, for example, a computer display screen, touch screen display, video monitor, television-like device, and/or a television. Display 1620 may be digital and/or analog. In various implementations, display 1620 may be a holographic display. Also, display 1620 may be a transparent surface that may receive a visual projection. Such projections may convey various forms of information, images, and/or objects. For example, such projections may be a visual overlay for a mobile augmented reality (MAR) application. Under the control of one or more software applications 1616, platform 1602 may display user interface 1622 on display 1620.

In various implementations, content services device(s) 1630 may be hosted by any national, international and/or independent service and thus accessible to platform 1602 via the Internet, for example. Content services device(s) 1630 may be coupled to platform 1602 and/or to display 1620, speaker subsystem 1660, and microphone subsystem 1670. Platform 1602 and/or content services device(s) 1630 may be coupled to a network 1665 to communicate (e.g., send and/or receive) media information to and from network 1665. Content delivery device(s) 1640 also may be coupled to platform 1602, speaker subsystem 1660, microphone subsystem 1670, and/or to display 1620.

In various implementations, content services device(s) 1630 may include a network of microphones, a cable television box, personal computer, network, telephone, Internet enabled devices or appliance capable of delivering digital information and/or content, and any other similar device capable of unidirectionally or bidirectionally communicating content between content providers and platform 1602 and speaker subsystem 1660, microphone subsystem 1670, and/or display 1620, via network 1665 or directly. It will be appreciated that the content may be communicated unidirectionally and/or bidirectionally to and from any one of the components in system 1600 and a content provider via network 1660. Examples of content may include any media information including, for example, video, music, medical and gaming information, and so forth.

Content services device(s) 1630 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1602 may receive control signals from navigation controller 1650 having one or more navigation features. The navigation features of controller 1650 may be used to interact with user interface 1622, for example. In implementations, navigation controller 1650 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures. The audio subsystem 1604 also may be used to control the motion of articles or selection of commands on the interface 1622.

Movements of the navigation features of controller 1650 may be replicated on a display (e.g., display 1620) by movements of a pointer, cursor, focus ring, or other visual indicators displayed on the display or by audio commands. For example, under the control of software applications 1616, the navigation features located on navigation controller 1650 may be mapped to virtual navigation features displayed on user interface 1622, for example. In implementations, controller 1650 may not be a separate component but may be integrated into platform 1602, speaker subsystem 1660, microphone subsystem 1670, and/or display 1620. The present disclosure, however, is not limited to the elements or in the context shown or described herein.

In various implementations, drivers (not shown) may include technology to enable users to instantly turn on and off platform 1602 like a television with the touch of a button after initial boot-up, when enabled, for example, or by auditory command. Program logic may allow platform 1602 to stream content to media adaptors or other content services device(s) 1630 or content delivery device(s) 1640 even when the platform is turned "off." In addition, chipset 1605 may include hardware and/or software support for 8.1 surround sound audio and/or high definition (7.1) surround sound audio, for example. Drivers may include an auditory or graphics driver for integrated auditory or graphics platforms. In implementations, the auditory or graphics driver may comprise a peripheral component interconnect (PCI) Express graphics card.

In various implementations, any one or more of the components shown in system 1600 may be integrated. For example, platform 1602 and content services device(s) 1630 may be integrated, or platform 1602 and content delivery device(s) 1640 may be integrated, or platform 1602, content services device(s) 1630, and content delivery device(s) 1640 may be integrated, for example. In various implementations, platform 1602, speaker subsystem 1660, microphone subsystem 1670, and/or display 1620 may be an integrated unit. Display 1620, speaker subsystem 1660, and/or microphone subsystem 1670 and content service device(s) 1630 may be integrated, or display 1620, speaker subsystem 1660, and/or microphone subsystem 1670 and content delivery device(s) 1640 may be integrated, for example. These examples are not meant to limit the present disclosure.

In various implementations, system 1600 may be implemented as a wireless system, a wired system, or a combination of both. When implemented as a wireless system, system 1600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1602 may establish one or more logical or physical channels to communicate information. The information may include media information and control information. Media information may refer to any data representing content meant for a user. Examples of content may include, for example, data from a voice conversation, videoconference, streaming video and audio, electronic mail ("email") message, voice mail message, alphanumeric symbols, graphics, image, video, audio, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 16.

Figure 17:
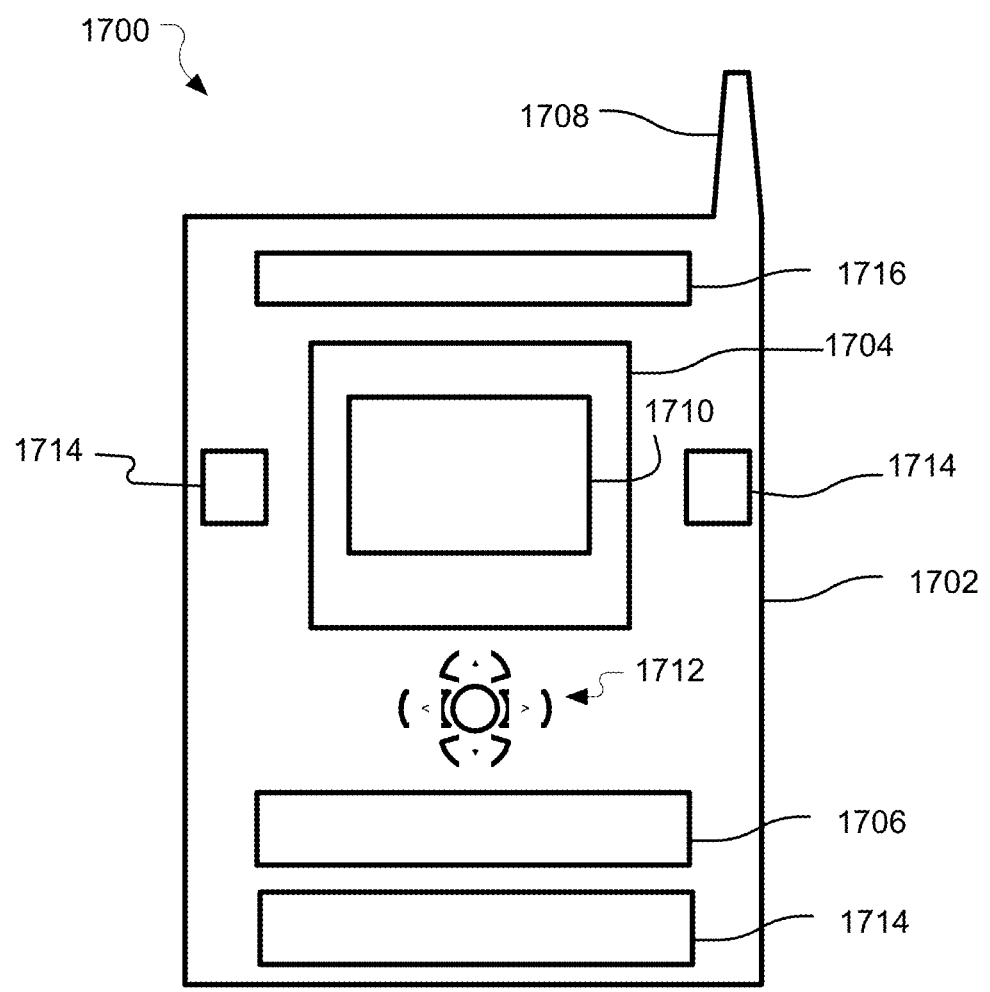
FIG. 17 illustrates another example device, all arranged in accordance with at least some implementations of the present disclosure.

Referring to FIG. 17, a small form factor device 1700 is one example of the varying physical styles or form factors in which system 300, 1500, or 1600 may be embodied. By this approach, device 1700 may be implemented as a mobile computing device having wireless capabilities and may be one device used in an example PAN described above. A mobile computing device may refer to any device having a processing system and a mobile power source or supply, such as one or more batteries, for example.

As described above, examples of a mobile computing device may include any device with an audio sub-system such as a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, speaker system, and/or microphone system or network.

Examples of a mobile computing device also may include computers that are arranged to be worn by a person, such as a head-phone, head band, hearing aide, wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 17, device 1700 may include a housing 1702, a display 1704 including a screen 1710, an input/output (I/O) device 1706, and an antenna 1708. Device 1700 also may include navigation features 1712. Display 1704 may include any suitable display unit for displaying information appropriate for a mobile computing device. I/O device 1706 may include any suitable I/O device for entering information into a mobile computing device. Examples for I/O device 1706 may include an alphanumeric keyboard, a numeric keypad, a touch pad, input keys, buttons, switches, rocker switches, software and so forth. Information also may be entered into device 1700 by way of one or more microphones 1714. Such information may be processed by an audio transmitter or source as described herein and as part of the device 1700, and may provide audio via a speaker 1716 or visual responses via screen 1710. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one implementation, a computer-implemented method of video coding comprises receiving color pixel data of at least one image; determining, on the at least one image, at least a first area of one uniform color adjacent a second area of a uniform color; forming a mask comprising mask image data at least comprising a map indicating which of the first and second areas at least some pixels of the image belong; and placing the mask in a bitstream to transmit the mask to a receiver to have the color of at least some of the pixels of the first area or second area or both on a decompressed version of the image at the receiver modified by using the map to determine the correct color for the pixels to display the decompressed image with the pixels with corrected colors.

The method also may comprise wherein the map is a binary listing of pixels where pixels to be assigned the first area have a 0 or 1 and pixels to be assigned the second area have the other of the 0 or 1; wherein the mask image data includes coordinates to indicate at least a start of the map; wherein the uniform color of an area is the pixel color values in the area being at least one of: (1) the same single color value on a color space range of values for a single color, and (2) a range of color values within the color space range of values for the single color;

The method also may comprise providing at least one correction color value in the bitstream as part of the mask image data and having average color values of either the first or second areas or two average color values with one for each of the first and second areas, and to be used to correct the color of at least some of the pixels corresponding to at least one of the first and second areas of the decompressed image at the receiver, wherein the average color values are formed from red-green-blue (RGB) color space values rather than values of the color space used for encoding; providing a plurality of correction color values of individual pixels in the first area or the second area or both in the mask image data to be placed in the bitstream to be used to correct the color of the pixels of the first and second areas of the image as decompressed at the receiver, wherein the correction color values of the individual pixels are RGB color values of the individual pixels rather than the color space used for encoding; wherein the first and second areas are found on the image or region on the image by using three RGB color space color-component histograms of the entire image or a region on the image to determine the areas with the uniform colors of the image or region, wherein the uniform colors of the first and second areas is established when at least one color component histogram has two peaks indicating two uniform colors, and the other two color component histograms have one or two uniform color peaks; and at least one of: searching the image for the first and second areas by dividing the image into a plurality of fixed position regions to determine whether both the first and second areas exist in a single one of the regions, and wherein the mask image data includes data indicating the location of the region on the image, and searching the image for the first and second areas by using a sliding window to determine whether the first and second areas both exist in a region formed by the window, and wherein the mask image data includes data indicating the location of the region on the image; wherein the first area is text; and the method may comprise determining whether the mask indicates a non-desirable program has changed the image.

By another implementation, a computer-implemented method of video coding comprises receiving a mask in a bitstream with mask image data at least comprising a map indicating whether pixels of an image belong in a first area of a uniform color in the image or a second area of a uniform color in the image and adjacent the first area in order to correct color values of pixels in the first area or second area or both on a decompressed version of the image; aligning the map with the first area or second area or both; changing the color values of at least some pixels in the first area or the second area or both by using correction color values associated with the first or second areas; and displaying the first and second areas on the image on a display including the pixels with the changed color values.

This method also may comprise wherein the mask is transmitted by at least one of: providing the mask to an encoder to entropy encode the mask to be placed in the bitstream with other compressed pixel data, providing the mask to a multiplexer to transmit the mask as un-encoded data packets with encoded image pixel data, and placing the mask in a bitstream band transmission that is separate from the bitstream transmitting compressed image pixel data.

The method also may comprise receiving at least one correction color value in the mask image data to be used to correct the color values of pixels in the first area or the second area or both, wherein the at least one correction color value are RGB color values rather than values of the color space used for encoding; at least one of: receiving at least one average color value respectively of the first and second areas and received as part of the mask image data to be used to modify the color value of pixels in the first area, second area, or both, and receiving correction color values of individual pixels of the first area and the second area, and received as part of the mask image data to be used to modify the color values of the first area, second area, or both, wherein the map is a binary listing of pixels where pixels to be assigned the first area have a 0 or 1 and pixels to be assigned the second area have the other of the 0 or 1; and receiving, as part of the mask image data, coordinates identifying at least a start of the map.

By another example, a computer-implemented system comprises at least one display; at least one memory to store color pixel data of at least one image; at least one processor communicatively coupled to the at least one of the memory and display; and a correction mask unit operated by the at least one processor and to: determine, on the at least one image, at least a first area of one uniform color adjacent a second area of a uniform color; form a mask comprising mask image data at least comprising a map indicating which of the first and second areas at least some pixels of the image belong; and have the mask placed in a bitstream to transmit the mask to a receiver to have the color of at least some of the pixels of the first area or second area or both on a decompressed version of the image at the receiver modified by using the map to determine the correct color for the pixels to display the decompressed image with the pixels with corrected colors.

In a further example, a computer-readable medium has stored thereon instructions that when executed cause a computing device to: receive a mask in a bitstream with mask image data at least comprising a map indicating whether pixels of an image belong in a first area of a uniform color in the image or a second area of a uniform color in the image and adjacent the first area and in order to correct color values of pixels in the first area or second area or both on a decompressed version of the image; align the map with the first area or second area or both; change the color values of at least some pixels in the first area or the second area or both by using correction color values associated with the first or second areas; and display the first and second areas on the image on a display including the pixels with the changed color values.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of video coding comprising:
    receiving color pixel data of at least one image of a video sequence;
    identifying, on the at least one image, at least one region that has only two uniform colors including a first area of one uniform color adjacent a second area of a uniform color;
    forming a mask comprising mask image data at least comprising a map indicating which of the first and second areas at least some pixels of the image belong; and
    placing the mask in a bitstream to transmit the mask to a receiver to have the color of at least some of the pixels of the first area or second area or both on a decompressed version of the image at the receiver modified by using the map to determine the correct color for the pixels to display the decompressed image with the pixels with corrected colors; and
    wherein the mask is arranged to change the color values of pixels of the decompressed version of the image without first determining whether or not the color values of the pixels of the decompressed version of the image meet a criteria to avoid the change.

2. The method of claim 1 wherein the map is a binary listing of pixels where pixels to be assigned the first area have a 0 or 1 and pixels to be assigned the second area have the other of the 0 or 1.

3. The method of claim 2 wherein the mask image data includes coordinates to indicate at least a start of the map.

4. The method of claim 1 wherein the uniform color of an area is the pixel color values in the area being at least one of: (1) the same single color value on a color space range of values for a single color, and (2) a range of color values within the color space range of values for the single color.

5. The method of claim 1 comprising providing at least one correction color value in the bitstream as part of the mask image data and having average color values of either the first or second areas or two average color values with one for each of the first and second areas, and to be used to correct the color of at least some of the pixels corresponding to at least one of the first and second areas of the decompressed image at the receiver.

6. The method of claim 5 wherein the average color values are formed from red-green-blue (RGB) color space values rather than values of the color space used for encoding.

7. The method of claim 1 comprising providing a plurality of correction color values of individual pixels in the first area or the second area or both in the mask image data to be placed in the bitstream to be used to correct the color of the pixels of the first and second areas of the image as decompressed at the receiver.

8. The method of claim 7 wherein the correction color values of the individual pixels are RGB color values of the individual pixels rather than the color space used for encoding.

9. The method of claim 1 wherein the first and second areas are found on the image or region on the image by using three RGB color space color-component histograms of the entire image or a region on the image to determine the areas with the uniform colors of the image or region.

10. The method of claim 9 wherein the uniform colors of the first and second areas is established when at least one color component histogram has two peaks indicating two uniform colors, and the other two color component histograms have one or two uniform color peaks.

11. The method of claim 1 comprising searching the image for the first and second areas by dividing the image into a plurality of fixed position regions to determine whether both the first and second areas exist in a single one of the regions, and wherein the mask image data includes data indicating the location of the region on the image.

12. The method of claim 1 comprising searching the image for the first and second areas by using a sliding window to determine whether the first and second areas both exist in a region formed by the window, and wherein the mask image data includes data indicating the location of the region on the image.

13. The method of claim 1 wherein the first area is text.

14. The method of claim 1 comprising determining whether the mask indicates a non-desirable program has changed the image comprising determining whether the mask is misaligned with the decompressed image.

15. A computer-implemented method of video coding comprising:
    receiving a mask in a bitstream with mask image data at least comprising a map indicating at least one region of an image of a video sequence has only two uniform colors and indicating whether pixels of the image belong in a first area of a uniform color in the image or a second area of a uniform color in the image and adjacent the first area in order to correct color values of pixels in the first area or second area or both on a decompressed version of the image;

aligning the map with the first area or second area or both;

changing the color values of at least some pixels in the first area or the second area or both by using correction color values associated with the first or second areas; and displaying the first and second areas on the image on a display including the pixels with the changed color values; and changing the color values of pixels of the decompressed version of the image without first determining whether or not the color values of the pixels of the decompressed version of the image meet a criteria to avoid the change.

16. The method of claim 15 wherein the mask is transmitted by at least one of:

providing the mask to an encoder to entropy encode the mask to be placed in the bitstream with other compressed pixel data, providing the mask to a multiplexer to transmit the mask as un-encoded data packets with encoded image pixel data, and placing the mask in a bitstream band transmission that is separate from the bitstream transmitting compressed image pixel data.

17. The method of claim 15 comprising receiving at least one correction color value in the mask image data to be used to correct the color values of pixels in the first area or the second area or both.

18. The method of claim 17, wherein the at least one correction color value are RGB color values rather than values of the color space used for encoding.

19. The method of claim 15 comprising receiving at least one average color value respectively of the first and second areas and received as part of the mask image data to be used to modify the color value of pixels in the first area, second area, or both.

20. The method of claim 15 comprising receiving correction color values of individual pixels of the first area and the second area, and received as part of the mask image data to be used to modify the color values of the first area, second area, or both.

21. The method of claim 15 wherein the map is a binary listing of pixels where pixels to be assigned the first area have a 0 or 1 and pixels to be assigned the second area have the other of the 0 or 1.

22. The method of claim 15 comprising receiving, as part of the mask image data, coordinates identifying at least a start of the map.

23. A computer-implemented system comprising:

at least one display;

at least one memory to store color pixel data of at least one image of a video sequence;

at least one processor communicatively coupled to the at least one of the memory and display; and a correction mask unit operated by the at least one processor and to:

identify, on the at least one image, at least one region that has only two uniform colors each formed from multiple pixels and including a first area of one uniform color adjacent a second area of a uniform color;

form a mask comprising mask image data at least comprising a map indicating which of the first and second areas at least some pixels of the image belong; and have the mask placed in a bitstream to transmit the mask to a receiver to have the color of at least some of the pixels of the first area or second area or both on a decompressed version of the image at the receiver modified by using the map to determine the correct color for the pixels to display the decompressed image with the pixels with corrected colors; and wherein the mask is arranged to change the color values of pixels of the decompressed version of the image without first determining whether or not the color values of the pixels of the decompressed version of the image meet a criteria to avoid the change.

24. A non-transitory computer-readable medium having stored thereon instructions that when executed cause a computing device to:

receive a mask in a bitstream with mask image data at least comprising a map indicating at least one region of an image of a video sequence has only two uniform colors and indicating whether pixels of the image belong in a first area of a uniform color in the image or a second area of a uniform color in the image and adjacent the first area and in order to correct color values of pixels in the first area or second area or both on a decompressed version of the image;

align the map with the first area or second area or both;

change the color values of at least some pixels in the first area or the second area or both by using correction color values associated with the first or second areas;

display the first and second areas on the image on a display including the pixels with the changed color values; and change the color values of pixels of the decompressed version of the image without first determining whether or not the color values of the pixels of the decompressed version of the image meet a criteria to avoid the change.

* * * * *